United States Patent [19]

Gomi et al.

[11] Patent Number: 6,083,417
[45] Date of Patent: Jul. 4, 2000

[54] THERMAL STORAGE AGENT, MANUFACTURING METHOD THEREOF, THERMAL STORAGE MATERIAL, MANUFACTURING METHOD THEREOF, THERMAL STORAGE DEVICE AND ACCUMULATING METHOD

[75] Inventors: Tomoki Gomi; Yoshio Irie, both of Himeji; Tadao Shimomura, Toyonaka, all of Japan

[73] Assignee: Nippon Shokubai Co., Ltd., Osaka, Japan

[21] Appl. No.: 08/973,076

[22] PCT Filed: Mar. 19, 1997

[86] PCT No.: PCT/JP97/00889

§ 371 Date: Nov. 18, 1997

§ 102(e) Date: Nov. 18, 1997

[87] PCT Pub. No.: WO97/34962

PCT Pub. Date: Sep. 25, 1997

[30] Foreign Application Priority Data

Mar. 21, 1996 [JP] Japan .................. 8-065002
Jun. 13, 1996 [JP] Japan .................. 8-152737

[51] Int. Cl.⁷ .................. C09K 5/00; C09K 5/06
[52] U.S. Cl. .................. 252/70; 165/10
[58] Field of Search .................. 252/70; 165/10

[56] References Cited

U.S. PATENT DOCUMENTS 5,565,132 10/1996 Salyer ........................ 252/70

FOREIGN PATENT DOCUMENTS

| 0 481 564 A2 | 4/1992 | European Pat. Off. . |
|---|---|---|
| 56-103273 | 8/1981 | Japan . |
| 57-96078 | 6/1982 | Japan . |
| 62-277484 | 12/1987 | Japan . |
| 2-170887 | 7/1990 | Japan . |
| 4-85387 | 3/1992 | Japan . |
| 4-278186 | 10/1992 | Japan . |
| 5-171138 | 7/1993 | Japan . |
| 6-58686 | 3/1994 | Japan . |
| 6-116550 | 4/1994 | Japan . |
| 7-026251 | 1/1995 | Japan . |
| 8-104866 | 4/1996 | Japan . |
| 9-31452 | 2/1997 | Japan . |

OTHER PUBLICATIONS

Patent Abstracts of Japan, Abstract No. JP402302489A, Japanese Patent Specification No. 02–302489, Dec. 1990.
Patent Abstracts of Japan, Abstract No. JP409310064A, Japanese Patent Specification No. 09–310064, Dec. 1997.
WPIDS Abstract No. 94–112004, abstract of Japanese Patent Specification No. 94–112004, Mar. 1994.
WPIDS Abstract No. 98–563433, abstract of Japanese Patent Specification No. 10–251627, Sep. 1998.

*Primary Examiner*—Anthony Green
*Attorney, Agent, or Firm*—Kubovcik & Kubovcik

[57] ABSTRACT

A thermal storage agent used, for example, for air-conditioning systems of buildings, exhibiting excellent thermal storage, thermal conduction and safety, and a manufacturing method thereof. The thermal storage agent contains particulate oil gel bodies prepared by letting an oil absorbent resin absorb, and thus swell with, a thermal storage oil-soluble substance, wherein the oily gel bodies have a unitary volume of not less than 0.01 cm³ and are in contact with one another. A manufacturing method in accordance with the present invention can produce the thermal storage agent by letting an oil absorbent resin that is prepared by suspension polymerization in a solution containing the oil-soluble substance absorb, and thus swell with, the oil-soluble substance.

27 Claims, 1 Drawing Sheet

THERMAL STORAGE AGENT, MANUFACTURING METHOD THEREOF, THERMAL STORAGE MATERIAL, MANUFACTURING METHOD THEREOF, THERMAL STORAGE DEVICE AND ACCUMULATING METHOD

FIELD OF THE INVENTION

The present invention relates to a thermal storage (accumulating) agent used for heat and cold storage, especially suitably used for heating and cooling air-conditioning systems of buildings, by the exploitation of latent heat generated by a transformation of phase, and further relates to a manufacturing method of such a thermal storage agent, a thermal storage material and device having the thermal storage agent, and a manufacturing method of the thermal storage material.

BACKGROUND OF THE INVENTION

Conventionally, in a case where heat is used as energy for domestic and industrial uses, the use of a thermal storage body, i.e., a medium for thermal transportation and temporary storage, has been proposed when the heat is generated and consumed at different places, and when there is a time lag between the generation of heat and the consumption thereof.

Thermal storage bodies typically exploit either sensible heat taking advantage of the thermal capacity thereof or latent heat produced by a transformation of phase thereof. Latent heat is a phenomenon of heat absorption upon the transformation from solid phase to liquid phase and heat release upon the transformation from liquid phase to solid phase.

Examples of such thermal storage bodies taking advantage of sensible heat include water, stone, and various kinds of metals. However, those taking advantage of sensible heat have drawbacks: a larger thermal storage tank is required to compensate for the low thermal capacity thereof and the low specific latent heat thereof, and the temperatures at the heat source and at the heat consumption are restricted because of a possible wide temperature range upon the extraction of the heat.

Meanwhile, examples of such thermal storage bodies taking advantage of latent heat include inorganic hydrated salts and hydrocarbons such as paraffins. However, it is known that inorganic hydrated salts generally show great supercooling, which results in serious drawbacks for real use: namely, freezing is hindered even below the melting point, and specific heat released is substantially reduced.

For these reasons, researches have been widely conducted to develop thermal storage agents from oil-soluble substances (oily substances) composed of paraffins and other hydrocarbons. Among them, oil-soluble substances such as paraffins and higher alcohols are attracting a large attention, because they release as comparatively large a amount of melting latent heat as approximately 40 cal/g to 60 cal/g, exceeding 30 cal/g, by a transformation from solid phase to liquid phase and vice versa, and also because they can offer any melting point ranging from as low as −20° C. to as high as 100° C. depending on the kind and/or mixture thereof.

The oil-soluble substances have disadvantages too: Since most of the oil-soluble substances are inflammable, when in liquid phase, they may leak, catch fire and spread easily. And paraffins and other hydrocarbons, when left at high temperatures for a long period of time, deteriorate in physical property and show supercooling, which causes serious negative effects.

To solve the disadvantage of the deterioration in physical property and the resultant supercooling, which causes serious negative effects, of paraffins and other hydrocarbons when left at high temperatures for a long period of time, it has been suggested to prevent supercooling by adding a nucleating agent (core forming agent) such as zeolite particles to paraffins and other hydrocarbons. However, such a nucleating agent still fails to produce enough of the potential effects thereof with hydrocarbons, because the nucleating agent is separated during use, especially when the hydrocarbons are in liquid phase, from the hydrocarbons in liquid phase due to the difference in specific weight.

When such hydrocarbons including paraffins are used as thermal storage agents for storing latent heat, since the hydrocarbons are used indoors in a large quantity, some preventive measures should be taken against the leakage thereof from the container due to the flow thereof when liquidized, so as to bring the thermal storage agents in line with Fire Service Law and other regulations over the use of inflammable thermal storage agents.

Accordingly, solutions to the aforementioned problems are suggested. Some of the examples are:

① a thermal storage material of a paraffin gelled by a gelling agent such as an amide, ester, or amino salt of N-acyl amino acid, or 12-hydroxy stearic acid (Japanese Laid-Open Patent Application No. 56-103273/1981 (Tokukaisho 56-103273)), ② a thermal storage body prepared by filling a bag-like sealed container with foaming substance holding a mixture of a paraffin and di-benzylidene sorbitol like an isolated island (Japanese Laid-Open Patent Application No. 57-96078/1982 (Tokukaisho 57-96078)), ③ a latent thermal storage device using a paraffin that is gelled like jelly by a freezing agent and sealed in a capsule (Japanese Laid-Open Patent Application No. 6-58686/1994 (Tokukaihei 6-58686)), ④ a thermal storage material prepared by mixing a paraffin and a hydrocarbon organic high polymer by mechanical means (Japanese Laid-Open Patent Application No. 4-85387/1992 (Tokukaihei 4-85387)) (The mixing with mechanical means refers to operations to stir, mix and knead in a state where any component to be mixed can flow or be deformed by an external force due to high temperatures or due to swelling, or preferably solution, of at least one of the components, i.e., a paraffin or a hydrocarbon organic high polymer, in a melted product of the other component.), ⑤ a thermal storage material prepared by diffusing oil absorbent resin particles having absorbed a paraffin in water, brine, etc. (Japanese Laid-Open Patent Application No. 6-116550/1994 (Tokukaihei 6-116550)), ⑥ a thermal storage device made up of a thermal storage tank filled with tiny solid oil absorbent resin particles having absorbed a paraffin so that the tiny particles can exchange heat with a thermal storage body such as water (Japanese Laid-Open Patent Application No. 4-278186/1992 (Tokukaihei 4-278186)), and ⑦ a thermal storage agent prepared by impregnating, with a paraffin, pellets made of a polyolefin such as polyethylene (Japanese Laid-Open Patent Application No. 62-277484/1987 (Tokukaisho 62-277484) and Japanese Laid-Open Patent Application No. 2-170887/1990 (Tokukaihei 2-170887)).

However, the thermal storage agents disclosed in Patent Applications ① to ④ may be dangerous: Paraffin may seep and is fluidized in a large quantity as a result of repeated transformations of phase (freezing and melting). If the container or capsule is broken, paraffin may leak, catch fire and spread.

The thermal storage agent and device disclosed in Patent Applications ⑤ and ⑥ have drawbacks: They are arranged so that the paraffin absorbed in an oil absorbent resin is dispersed in a medium such as water in minuscule volume units. The thermal storage agent and device with such an arrangement do not freeze at a target temperature or within a predetermined time, and the heat stored by heating or cooling cannot be extracted efficiently, i.e., a satisfactory thermal storage efficiency cannot be obtained.

Meanwhile, the thermal storage agent disclosed in Patent Applications ⑦ has a disadvantage of latent heat of a low quantity, because the equilibrium absorption ratio is low with respect to the paraffin present in polyolefin as an oil absorbent resin. In addition, in order to prevent the paraffin from seeping from the thermal storage agent, it is necessary to coat or crosslink the surface of the polyethylene, etc., to increase the viscosity of the paraffin, and to carry out the process of paraffin absorption at high temperatures.

In the above Patent Applications, since the thermal storage material is a molded product either gelled or mixed with a binder component in advance, it is troublesome to fill, with the thermal storage body as a molded product, such a container having a complex shape to ensure a large contact area with a medium, for example, a container having a shape of a small tube, donut, coil, etc. Besides, it is difficult to completely fill up the container with the molded product, and a resultant low filling ratio leads to a low thermal efficiency.

Moreover, when the container is filled with the thermal storage material prepared by a method disclosed in Patent Application ①, the filling operation needs to be conducted at very high temperatures such that the thermal storage material is melted and liquidized. Therefore, practically, the thermal storage material cannot be used to fill a container of a low thermal resistance, such as a container fabricated from polyvinyl chloride, and can only be used with, for example, a container fabricated from a highly heat resistant, but, expensive resin material or a corrosion resistant, but, expensive stainless steel.

The present invention, in view of the above yet-to-be-solved problems and disadvantages, has an object to provide a highly safe thermal storage agent with a good thermal storage efficiency and a manufacturing method of such a thermal storage agent, and to further provide a thermal storage device, a thermal storage material, and a manufacturing method thereof.

DISCLOSURE OF THE INVENTION

The inventors of the present invention have diligently conducted researches in order to accomplish the object. As a result, the inventors of the present invention have found that a thermal storage agent containing an oily gel body composed of an oil absorbent resin and a thermal storage oil-soluble substance, wherein the unitary volume of the oily gel body equals or exceeds 0.01 cm$^3$, a thermal storage device having such a thermal storage agent, and a thermal storage material having such a thermal storage agent are superior in thermal storage efficiency and safety, which has led to the completion of the invention.

That is, in order to solve the problems, the thermal storage agent in accordance with the present invention is characterized in that it contains an oily gel body composed of an oil absorbent resin and a thermal storage oil-soluble substance, wherein the unitary volume of the oily gel body equals or exceeds 0.1 cm$^3$.

With the arrangement, since supercooling of the oil-soluble substance can be restrained by the unitary volume of the oily gel body that equals or exceeds 0.01 cm$^3$, it is possible to obtain a thermal storage agent with a high thermal storage efficiency. Besides, since the oily gel body contains an oil absorbent resin and a thermal storage oil-soluble substance, the oil-soluble substance does not separate at all, or if ever, only a small quantity thereof separates from the oily gel body.

Therefore, when the oil-soluble substance is liquidized, or when the oil-soluble substance separates from the oily gel body, the thermal storage agent is free from leakage or fluidization of the oil-soluble substance, being much less likely to catch fire or spread (if ever caught fire). That is, the thermal storage agent is safer than conventional thermal storage agents. In addition, since supercooling of the oil-soluble substance is restrained, and the transformation from liquid phase to solid phase occurs in a shorter period of time, the thermal storage agent can have a much higher thermal storage efficiency than conventional thermal storage agents.

In order to solve the problems, another thermal storage agent in accordance with the present invention is characterized in that it contains particulate oily gel bodies composed of a particulate oil absorbent resin and a thermal storage oil-soluble substance, wherein the oily gel bodies are in contact with one another without losing the individual surfaces thereof.

With the arrangement, since the oily gel bodies remain particulate, when the oil-soluble substance freezes and melts, the change in volume is buffered. Thus, the pressure exerted on the container, and the deformation of the container are reduced. Besides, since the oily gel bodies remain particulate, the leakage of the oil-soluble substance from the oily gel bodies is restrained.

In addition, in the thermal storage agent, since being an aggregate (continuum) of particulate oily gel bodies, even if the oil-soluble substance leaks from one of the oily gel bodies composing the thermal storage agent, the net leakage of the oil-soluble substance from the thermal storage agent is also restrained, because the oily gel bodies adjacent to that oily gel body absorb the leaking oil-soluble substance.

In addition, since empty spaces are formed by the oily gel bodies that are adjacent to one another, supercooling is restrained, and various additives such as a thermal conduction improver, nucleating agent, and fire retarding agent can be added uniformly. Therefore, with the arrangement, it becomes possible to provide excellent thermal conduction, excellent thermal storage, and improved safety.

In addition, in the thermal storage agents, the oil-soluble substance is preferably a compound that is thermal storing owing to the transformation from liquid phase to solid phase and vice versa.

With the arrangement, since supercooling of the oil-soluble substance can be further reduced, and the transformation from liquid phase to solid phase and vice versa occurs in a short period of time, it is possible to obtain a thermal storage agent having an extremely high thermal storage efficiency, compared with conventional thermal storage agents.

In the above thermal storage agents, the oil absorbent resins are preferably prepared by suspension polymerization or suspension condensation polymerization.

With the arrangement, if the oil absorbent resin obtained by suspension polymerization or suspension condensation polymerization is let to absorb the oil-soluble substance, oily gel bodies are obtained in shapes that are more similar to spheres. Therefore, the oily gel bodies are more easily condensed than when the oily gel bodies form an aggregate of particles of a variety of shapes (irregular shapes), thereby allowing the continuum to be formed more densely, and the various additives to be even more uniformly added and mixed.

In order to solve the problems, even another thermal storage agent in accordance with the present invention is arranged so as to contain an oily gel body composed of a thermal storage oil-soluble substance and an oil absorbent resin with an equilibrium absorption ratio not less than 3 g/g at a temperature of 25° C. with respect to pentadecane, wherein the unitary volume of the oily gel body equals or exceeds 0.01 cm$^3$.

In order to solve the problems, still another thermal storage agent in accordance with the present invention is arranged so as to contain an oily gel body composed of a thermal storage oil-soluble substance and an oil absorbent resin with an equilibrium absorption ratio not less than 3 g/g at a temperature of (X+10) ° C. with respect to the oil-soluble substance, X representing the melting point of the oil-soluble substance in degrees centigrade, wherein the unitary volume of the oily gel body equals or exceeds 0.1 cm$^3$.

With the arrangements, the thermal storage agent can be impregnated with the oil-soluble substance at comparatively low temperatures, the oily gel bodies, i.e., the thermal storage agent in accordance with the present invention, can be manufactured at comparatively low temperatures, and the oil-soluble substance is prevented from separating from the oily gel body. Therefore, the resultant thermal storage agent is much safer with less leakage of the oil-soluble substance, far fewer chances of catching fire and spreading (if ever caught fire), compared to conventionally prepared counterparts. In addition, since the equilibrium absorption ratio of the oil absorbent resin is not less than 3 g/g with respect to an oil-soluble substance, the thermal storage agent using the oil absorbent resin has a greater quantity of latent heat, and therefore is superior in thermal storage efficiency.

In order to solve the problems, a thermal storage device in accordance with the present invention is characterized in that it contains one of the above-mentioned thermal storage agents.

In order to solve the problems, a thermal storage material in accordance with the present invention is characterized in that it is prepared by filling a container with one of the above-mentioned thermal storage agents.

With the arrangements, the thermal storage device and the thermal storage material have good thermal storage efficiency and excellent safety because of the use of one of the above-mentioned thermal storage agents.

In order to solve the problems, a manufacturing method of a thermal storage material in accordance with the present invention is characterized in that it includes steps of first mixing a particulate oil absorbent resin and a thermal storage oil-soluble substance, then filling a container with the mixture in a state in which the mixture has fluidity, and gelling the mixture in the container to lower the fluidity of the mixture.

According to the method, when a continuum of the oily gel body is formed, since the continuum can be easily formed in close contact with one another in the container, bubbles are less likely to exist inside the thermal storage agent. This can improve the adhesion to a thermally conductive surface in a device for cooling or heating an obtained oily gel body as a thermal storage agent, and produce a thermal storage material with excellent thermal conduction.

In order to solve the problems, another manufacturing method of a thermal storage agent in accordance with the present invention is characterized in that it includes the step of polymerizing a monomer component in a thermal storage oil-soluble substance, whereby the oil-soluble substance is held in a polymer prepared by polymerizing the monomer component so as to lower fluidity of the oil-soluble substance liquidized due to a phase transformation.

According to the method, the formation of a polymer in an oil-soluble substance, the polymer having been prepared by polymerizing the monomer component, enables the polymer to hold the oil-soluble substance therein so as to lower fluidity of the oil-soluble substance liquidized due to a phase transformation, and also enables the oil-soluble substance to be in a gel state or a solid state. Therefore, according to the method, since a thermal storage agent is obtained with an oil-soluble substance which shows less leakage, including seeping, even after repeated process of freezing and melting for thermal storage and radiation, a highly safe thermal storage agent can be stably obtained with fewer chances of combustion of the oil-soluble substance.

The manufacturing method of a thermal storage agent is preferably such that the polymer prepared by polymerizing the monomer component has a crosslinking structure.

The manufacturing method of a thermal storage agent is preferably such that the monomer component includes a crosslinking monomer having at least two polymeric unsaturated groups per molecule, and the crosslinking structure is formed from the crosslinking monomer by copolymerizing the monomer component.

The manufacturing method of a thermal storage agent is preferably such that the monomer component includes a reactive monomer having a functional group for crosslink formation, and the crosslinking structure is formed by crosslinking the polymer prepared by copolymerizing the monomer component in the oil-soluble substance between functional groups with a crosslinking agent in a state in which the oil-soluble substance is contained.

According to the methods, since the polymer has a crosslinking structure, since it is possible to reduce leakage, including seeping, of the oil-soluble substance held in the thermal storage agent, it becomes possible to stably obtain a safer thermal storage agent with fewer chances of combustion of the oil-soluble substance.

The manufacturing method of a thermal storage agent is preferably such that the combination of the functional group present in the reactive monomer and the functional group present in the crosslinking agent is a combination of at least one functional group selected from a carboxyl group, a hydroxyl group, a mercapto group, an amino group, and an amide group and at least one functional group selected from an isocyanate group, an epoxy group, and a carboxylic anhydride group.

According to the method, since the combination of the functional group present in the reactive monomer and the functional group present in the crosslinking agent is selected from the aforementioned combinations, it is possible to obtain a polymer with a reduced amount of an unreacted residual functional group. Therefore, it is possible to obtain a thermal storage agent that does not degrade the thermal storing property of the oil-soluble substance by letting the polymer hold the oil-soluble substance, and to improve thermal storage.

The manufacturing method of a thermal storage agent is preferably such that the reactive monomer contains a hydroxyl group, and the crosslinking agent contains at least two isocyanate groups.

According to the method, since it is possible to obtain a polymer with a reduced amount of an unreacted residual functional group, it is possible to obtain a thermal storage agent that does not degrade the thermal storing property of the oil-soluble substance. Moreover, according to the method, it becomes possible to gel the oil-soluble substance at low temperatures. Therefore, the oil-soluble substance in a gel state is not necessarily held in a heat resistant container, it is possible to obtain a thermal storage agent with excellent thermal storage and long term stability.

The manufacturing method of a thermal storage agent is preferably such that the monomer component contains not less than 50 weight percent of a monomer having a solubility parameter of not more than 9.

According to the method, since the monomer component contains not less than 50 weight percent of a monomer having a solubility parameter of not more than 9, it becomes possible to stably obtain a thermal storage agent that stably holds an oil-soluble substance, even if the oil-soluble substance is in a liquidized state, and to improve long term stability.

Even another manufacturing method of a thermal storage material in accordance with the present invention is characterized in that it uses one of the aforementioned manufacturing methods of a thermal storage agent, and includes the sequential steps of filling the container with the monomer component or the uncrosslinked polymer that is in a liquid state, and setting the same in the container.

According to the method, since it is easily possible to liquidize a mixture of an oil-soluble substance and, for example, a monomer component or an uncrosslinked polymer at comparatively low temperatures near room temperature, it is possible to easily fill a container densely with the oil-soluble substance and the monomer component or the uncrosslinked polymer.

Next, by polymerizing or crosslinking the mixture of the oil-soluble substance and the monomer component or the uncrosslinked polymer in the container at a comparatively low temperature near room temperature, it is possible to fill the container densely with the resultant thermal storage agent in a state in which the oil-soluble substance is held in the polymer.

According to the method, since it is also possible to fill the container with a larger amount of the thermal storage oil-soluble substance for this reason, it becomes possible to stably obtain a thermal storage agent with an improved thermal storage efficiency of the oil-soluble substance, compared to conventional counterparts.

Besides, according to the method, by setting in the container, for example, a monomer component or an uncrosslinked polymer which is in a liquid state by polymerizing or crosslinking the same, for example, at a temperature near room temperature, less attention should be paid to the heat resistance of a container to be used. Since this permits the use of inexpensive raw material for the container without paying special attention to heat resistance, etc., it is possible to surely obtain a thermal storage agent at a low cost.

BEST MODES OF CARRYING OUT THE INVENTION

Figure 1:
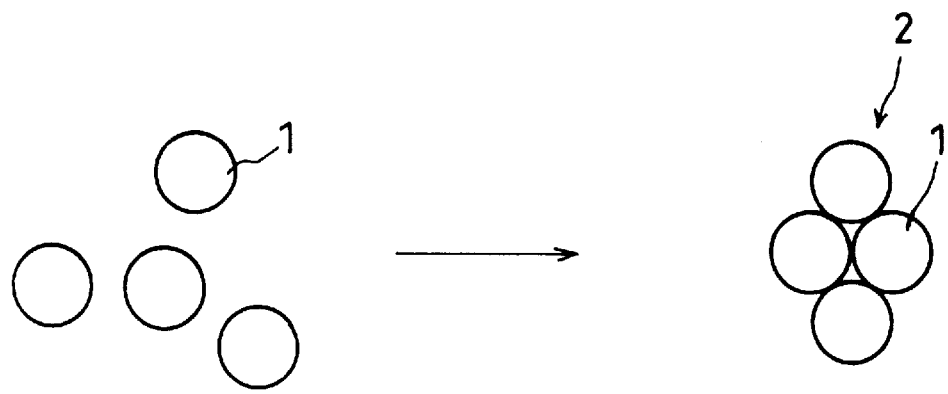
FIG. 1 is an illustration showing an embodiment of the thermal storage agent in accordance with the present invention.

The following description will discuss an embodiment in accordance with the present invention in more detail.

A thermal storage agent in accordance with the present invention contains an oily gel body containing an oil absorbent resin and a thermal storage oil-soluble substance.

Any thermal storage oil-soluble substance can be used in the present invention as long as it absorbs and releases latent heat by a solid-liquid transformation and a liquid-solid transformation, and is practically insoluble or hardly soluble in water in a particular temperature range. Some examples of such an oil-soluble substance are paraffins including paraffin wax, isoparaffin, polyethylene wax, and n-paraffin such as tetradecane, pentadecane, and hexadecane; fatty acids such as stearic acid, and palmitic acid; fatty acid esters such as stearic acid butyl; alcohols such as decanol, and dodecyl alcohol.

Any one of the oil-soluble substances can be used alone, or alternatively, a plurality of them can be used in combination if necessary. Among those oil-soluble substances, paraffins are especially preferred, because they release a great quantity of melting latent heat at a definite freezing point and allow the freezing point to be selected freely.

Any oil absorbent resin can be used in the present invention as long as it absorbs the aforementioned oil-soluble substance. However, the oil absorbent resin desirably absorbs the oil substance of not less than 0.5 grams, preferably not less than 3 grams, and more preferably not less than 8 grams per gram of the oil absorbent resin. Especially preferred among the oil absorbent resins are those exhibiting an equilibrium absorption ratio not less than 3 g/g at a temperature of 25° C. with respect to paraffin, especially pentadecane, and those exhibiting an equilibrium absorption ratio not less than 3 g/g at a temperature 10° C. higher than the melting point of the adopted oil-soluble substance with respect to that oil-soluble substance.

Such oil absorbent resins can be easily prepared by polymerizing monomer components including monomers that exhibit a solubility parameter (SP value) not exceeding 9 and that contain a single polymeric group per molecule (hereinafter, such monomers will be referred to as monomers (A) for convenience of description).

The solubility parameter is a parameter typically used as a measure indicating polarity of a compound. The solubility parameter in the present invention (unit: $(cal/cm^3)^{1/2}$) is derived from Small's formula substituted by Hoy's cohesive energy constant.

Monomer (A) can contain any polymeric group as long as the polymeric group can be polymerized and form an oil absorbent resin with a polymerization method such as radical polymerization, radiation-induced polymerization, addition polymerization, or condensation polymerization. Preferred among monomers (A) are monomers containing a polymeric unsaturated group that permits an easy manufacture of the oil absorbent resin with radical polymerization (hereinafter, such monomers will be referred to as monomers (a) for convenience of description).

Examples of monomers (a) include unsaturated carbonate esters such as propyl(meth)acrylate, n-butyl (meth)acrylate, iso-butyl(meth)acrylate, t-butyl (meth)acrylate, 2-ethylhexyl(meth)acrylate, n-octyl (meth)acrylate, dodecyl (meth)acrylate, stearil(meth)acrylate, phenyl(meth)acrylate, octylphenyl(meth)acrylate, nonylphenyl(meth)acrylate, dinonylphenyl(meth)acrylate, cyclohexyl(meth)acrylate, menthyl(meth)acrylate, isobornyl(meth)acrylate, dibutylmaleate, didodecylmaleate, dodecylcrotonate, and didodecylitaconate; (meth)acrylamides containing a hydrocarbon group such as (di)butyl(meth)acrylamide, (di)dodecyl(meth)acrylamide, (di)stearil(meth)acrylamide, (di)butylphenyl(meth)acrylamide, and (di)octylphenyl(meth)acrylamide; alicyclic vinyl compounds such as vinyl cyclohexane; allylethers containing a hydrocarbon group such as dodecylallylether; vinyl esters containing a hydrocarbon group such as caproic acid vinyl, lauric acid vinyl, palmitic acid vinyl, and stearic acid vinyl; vinyl ethers containing a hydrocarbon group such as butyl vinyl ether, and dodecyl vinyl ether; and aromatic vinyl compounds such as styrene, t-butylstyrene, and octylstyrene.

Any monomer can be used as monomer (A) as long as it meets the aforementioned conditions. Other than the above mentioned monomers (a), e.g. norbornene monomers, can be used as monomer (A). When a norbornene monomer is used as monomer (A), a desired oil absorbent resin can be prepared easily with a polymerization method such as ring-opening polymerization or radical polymerization.

Any one of monomers (A) can be used alone, or alternatively, a plurality of them can be used in combination if necessary. Among those monomers (A), monomers (a) are especially preferred. Especially preferred among monomers (a) are monomers containing at least one aliphatic hydrocarbon group of a carbon number from 3 to 30 selected from alkyl(meth)acrylate, alkylaryl(meth)acrylate, alkyl(meth)acrylamide, alkylaryl(meth)acrylamide, aliphatic vinyl esters, alkyl vinyl ethers, and alkylstyrenes (hereinafter, such monomers will be referred to as monomers (a') for convenience of description), because those monomers enable prepared oil absorbent resins to possess a better oil-soluble substance absorbing function and a better oil holding function. Still especially preferred among monomers (a') are monomers containing at least one aliphatic hydrocarbon group of a carbon number from 4 to 24, and the most preferred are monomers containing at least one aliphatic hydrocarbon group of a carbon number from 8 to 18.

If necessary, the aforementioned monomer components can include any other monomer, i.e., any monomer that is not monomer (A), as long as that monomer can be polymerized with monomer (A). Such a monomer is, for example, a monomer that exhibits a solubility parameter of not less than 9 and that contains a single polymeric unsaturated group per molecule, and a crosslinking monomer containing at least two polymeric unsaturated groups per molecule.

Some examples of monomers that exhibit a solubility parameter of not less than 9 and that contain a single polymeric unsaturated group per molecule are (meth)acrylic acid, acrylonitrile, maleic anhydride, fumaric acid, hydroxyethyl(meth)acrylate, polyethylene glycol (meth)acrylate, and methoxypolyethylene glycol (meth)acrylate.

Some examples of the crosslinking monomers are ethylene glycol di(meth)acrylate, diethylene glycol di(meth)acrylate, polyethylene glycol di(meth)acrylate, polyethylene glycol-polypropylene glycol di(meth)acrylate, propylene glycol di(meth)acrylate, polypropylene glycol di(meth)acrylate, 1,3-butylene glycol di(meth)acrylate, neopentyl glycol di(meth)acrylate, 1,6-hexandiol di(meth)acrylate, N,N'-methylenebisacrylamide, N,N'-propylenebisacrylamide, glycerine tri (meth)acrylate, trimethylolpropanetri(meth) acrylate, tetramethylolmethanetetra(meth)acrylate, multifunctional methacrylates prepared by esterization of a (meth)acrylic acid with the alkyleneoxide addition product of a polyhydric alcohol (e.g., glycerin, trimethylolpropane or tetramethylolmethane), and divinyl benzene.

Any one of those other monomers can be used alone, or alternatively, a plurality of them can be used in combination if necessary.

The monomers are preferably used, that is, monomer (A) is preferably contained in the monomer components, in an amount of not less than 50 weight percent, and more preferably not less than 70 weight percent. If monomer (A) is contained in an amount of less than 50 weight percent, an oil absorbent resin may not be obtained with an excellent oil-soluble substance absorbing function as desired.

The other monomers present in the monomer components can be used in any range not exceeding 50 weight percent as long as the physical properties of a resultant oil absorbent resin are not destroyed.

For example, when the monomer components include a crosslinking monomer, the amount of the crosslinking monomer in the monomer components is preferably 0.001 weight percent to 4 weight percent. That is, when the monomer components include a crosslinking monomer, the mixture ratios of the monomers are preferably as follows: The amount of the crosslinking monomer is preferably 0.001 weight percent to 4 weight percent, whereas the total amount of the monomers including monomer (A) but excluding the crosslinking monomer is preferably 96 weight percent to 99.999 weight percent. (The amounts of the monomers add up to 100 weight percent, that is, the total amount of all the monomers equals 100 weight percent, and the ratio of monomer (A) in the monomer components is not less than 50 weight percent.)

If the ratio of the crosslinking monomer in the monomer components exceeds 4 weight percent, the resultant oil absorbent resin has too high a crosslinking density and cannot absorb a large amount of oil-soluble substance, which is undesirable. By contrast, if the ratio of the crosslinking monomer is less than 0.001 weight percent, the addition of the crosslinking monomer does not produce a sensible effect.

The monomer components further including the crosslinking monomer are effective in introducing a crosslinking structure to the resultant oil absorbent resin and restraining the solubility of the oil absorbent resin to the oil soluble substance. The oil absorbent resin having a crosslinking structure makes it easier to control the oil absorbency and makes it possible to prevent fluidization and leak of the oil-soluble substance.

As a result of this, it becomes possible to ensure the shape preservation property of the oily gel body after oil absorption. Besides, since the effluent component is reduced, the phase transformation temperature of the oil-soluble substance becomes definite, and a drop in the freezing point can be prevented.

Examples of the aforementioned oil absorbent resin, in addition to the aforementioned polymers of the monomer components, include a styrene/butadiene copolymer; a hydrogenated styrene/butadiene copolymer; a styrene/butadiene/isoprene copolymer; an ethylene/propylene copolymer; an ethylene/propylene/third component copolymer; a copolymer containing dimethylsiloxane, such as dimethylsiloxyl(meth)acrylate; a sulfonated ethylene/propylene copolymer; a polybutadiene; a polyisobutylene; a polyisoprene; a polyacrylonitrile; an acrylonitrile/butadiene copolymer; an isobutylene/isoprene copolymer; and a copolymer containing a halogen, such as polychloroprene, chlorinated polyethylene, chlorinated polybutyl, brominated polybutyl, and chlorosulfonated polyethylene.

Especially preferred among those oil absorbent resins are oil absorbent resins other than polyolefin and copolymer having high crystallinity therein, and in particular oil absorbent resins prepared by polymerizing monomer components containing at least one aliphatic hydrocarbon group of a carbon number from 3 to 30 and also containing not less than 50 weight percent of at least one kind of monomer (unsaturated compound) selected from alkyl(meth)acrylate, alkylaryl(meth)acrylate, alkyl(meth)acrylamide, alkylaryl (meth)acrylamide, aliphatic vinyl esters, alkyl vinyl ethers, and alkylstyrenes, because such oil absorbent resins enable prepared thermal storage agents to possess high compatibility with the oil-soluble substance and to allow little leakage of the oil-soluble substance, which is desirable.

Furthermore, if in particular an oil absorbent resin prepared by polymerizing monomer components containing at least one aliphatic hydrocarbon group of a carbon number from 4 to 24 and also containing not less than 50 weight percent of at least one kind of monomer (unsaturated compound) selected from alkyl(meth)acrylate, alkylaryl (meth)acrylate, alkyl(meth)acrylamide, alkylaryl(meth) acrylamide, aliphatic vinyl esters, alkyl vinyl ethers, and alkylstyrenes is used as the aforementioned oil absorbent resin, the compatibility of the oil absorbent resin with the oil-soluble substance is enhanced further, and a thermal storage agent allowing no leakage of the oil-soluble substance can be prepared.

Furthermore, if in particular an oil absorbent resin prepared by polymerizing monomer components containing at least one aliphatic hydrocarbon group of a carbon number from 8 to 18 and also containing not less than 50 weight percent of at least one kind of monomer (unsaturated compound) selected from alkyl(meth)acrylate, alkylaryl (meth)acrylate, alkyl(meth)acrylamide, alkylaryl(meth) acrylamide, aliphatic vinyl esters, alkyl vinyl esters, and alkylstyrenes is used as the aforementioned oil absorbent resin, an oily gel body can be prepared with proper flexibility. Therefore, such an arrangement produces, in addition to the effects described above, effects of improving the adhesion to a thermally conductive surface of a device for cooling or heating an obtained thermal storage agent and hence improving the thermal conduction.

In addition, if the oil absorbent resin is prepared by polymerizing, in particular among the aforementioned monomers, monomer components containing not less than 50 weight percent alkyl(meth)acrylate, transparency of the oily gel body can be maintained at a high level also by repeated freezing and melting. Therefore the thermal storage agent can be prepared with optical transparency.

Although a polyolefin such as polyethylene or a polymer having high crystallinity, for example, can be used alternatively as the oil absorbent resin, for example, the surface of the oil absorbent resin needs to be coated or crosslinked, or the viscosity of the oil-soluble substance needs to be increased, in order to prevent leakage. An oil absorbent resin composed of polyethylene can be impregnated with oil-soluble substance only at high temperatures.

Accordingly, in order to obtain an easy-to-manufacture and highly safe thermal storage agent, the oil absorbent resin is preferably an oil absorbent resin other than polyolefin and the polymer having high crystallinity, for example, the aforementioned oil absorbent resin prepared by polymerizing at least one kind of monomer selected from monomers (a'), the aforementioned oil absorbent resin exhibiting an equilibrium absorption ratio not less than 3 g/g at a temperature of 25° C. with respect to pentadecane, and the aforementioned oil absorbent resin exhibiting an equilibrium absorption ratio not less than 3 g/g at the temperature 10° C. higher than the melting point of the adopted oil-soluble substance.

If the aforementioned oil absorbent resins, capable of being impregnated with the oil-soluble substance at comparatively low temperatures, are used, the aforementioned oily gel body, that is, a thermal storage agent in accordance with the present invention can be manufactured at comparatively low temperatures, the oil-soluble substance is prevented from being separated from the oily gel body, and the resultant thermal storage agent, capable of preventing the oil-soluble substance from leaking, catching fire and spreading (if ever caught fire) far better than conventionally prepared counterparts, is much safer.

Especially, if the oil-soluble substance contained in the oil absorbent resin has an equilibrium absorption ratio of not less than 3 g/g, since the thermal storage agent prepared from the oil absorbent resin can increase latent heat thereof further, it is possible to obtain a thermal storage agent with excellent thermal storage efficiency.

The manufacture of the oil absorbent resins in accordance with the present invention can adopt the aforementioned various conventionally known polymerization methods: e.g., radical polymerization, radiation-induced polymerization, addition polymerization, and condensation polymerization.

The oil absorbent resins can be easily manufactured by, for example, dispersing the monomer components in an aqueous medium in the presence of a protective colloid agent and a surface active agent, and then polymerizing the dispersed monomer components in a suspended manner with a polymerization initiator such as an oil-soluble radical polymerization initiator. Alternatively, the monomer components are first dissolved in a water-insoluble organic solvent and then polymerized in a suspended manner.

Any kind of protective colloid agent and surface active agent can be used in any amount. Examples of the protective colloid agents include polyvinyl alcohol, hydroxyethylene cellulose, and gelatin. Examples of the surface active agents include sodium alkyl sulfonic acid, sodium alkylzenzene sulfonic acid, polyoxyethylene alkylether, and soap of a fatty acid. Any one of those protective colloid agents and surface active agents can be used alone, or alternatively, a plurality of them can be used in combination if necessary.

Any kind of polymerization initiator can be used. Examples of the polymerization initiators include organic peroxides such as benzoyl peroxide, lauroyl peroxide, and cumene hydroperoxide; and azo compounds such as 2,2'-azo bisisobutyl nitrile and 2,2'-azo bisdimethyl valeronitrile. Any one of those polymerization initiators can be used alone, or alternatively, a plurality of them can be used in combination if necessary. The polymerization initiator is preferably used in a range of 0.1 weight percent to 5 weight percent to the monomer components, depending upon the kind and quantity of the monomer components.

The polymerization process can be carried out at any polymerization temperature, but preferably at a temperature that is appropriately determined in a range of 0° C. to 150° C. according to the kinds of the monomer components, polymerization initiator, etc. The polymerization process can be carried out for any appropriate length of a period of time, but preferably for a period that is appropriately determined according to the kinds, quantity, and reaction temperature of the monomer components, polymerization initiator, etc. so that the process can be completed.

Preferred among these methods are suspension polymerization and suspension condensation polymerization, because particulate oil absorbent resin, in particular, spherical oil absorbent resin is directly obtained after polymerization. The spherical shape of the oil absorbent resin offers a large surface area and thereby increases the absorption rate of the oil-soluble substance.

In other words, the oily gel body used for the thermal storage agent in accordance with the present invention can be easily prepared by letting the oil absorbent resin absorb, and thus swell with, the oil-soluble substance in liquid phase at a temperature higher than the freezing point of the oil-soluble substance. When letting the oil absorbent resin absorb, and thus swell with, the oil-soluble substance in liquid phase, the oil absorbent resin and oil-soluble substance can be heated to shorten the time for the oil absorbent resin to absorb the oil-soluble substance.

The oil absorbent resin and the oil-soluble substance are preferably used, that is, the oil absorbent resin and the oil-soluble substance are preferably contained in the oily gel body, in any amount, however, preferably in an amount of 4 weight percent to 20 weight percent and in an amount of 96 weight percent to 80 weight percent respectively.

If the oil absorbent resin is contained in an amount of less than 4 weight percent, the oil absorbent resin cannot absorb, or swell with, the whole amount of the oil-soluble substance, and is likely to cause the oil-soluble substance in liquid phase to leak and be fluidized. On the other hand, if the oil absorbent resin is contained in an amount of more than 20 weight percent, the oil absorbent resin contains too small an amount of the oil-soluble substance, and the phase-transformation latent heat of the resultant thermal storage agent is likely to decrease.

In addition, if the oil absorbent resin is particulate, the oil absorbent resin analogously swells upon the absorption of the oil-soluble substance, and produces a particulate oily gel body. In short, as shown in FIG. 1, the thermal storage agent 2 in accordance with the present invention preferably has such a structure that the oily gel bodies 1 are particulate and in contact with one another without losing the individual surfaces thereof. Due to that structure, the thermal storage agent 2 has empty spaces formed by the oily gel bodies 1 that are in contact with one another. Therefore, when the oil-soluble substance freezes and melts, the thermal storage agent 2 is buffered in its changes in volume, thus exerting less pressure on the container and causing less deformation of the container. Besides, since the oily gel bodies remain particulate, the leakage of the oil-soluble substance from the oily gel bodies 1 is restrained.

The net leakage of the oil-soluble substance from the thermal storage agent 2 is also restrained, because even if the oil-soluble substance leaks from one of the oily gel bodies 1 composing the thermal storage agent 2 that is an aggregate (continuum) of the particulate oily gel bodies 1, the oily gel bodies 1 adjacent to that oily gel body 1 absorb the leaking oil-soluble substance.

Being an aggregate (continuum) of the particulate oily gel bodies 1 and having empty spaces formed by the oily gel bodies 1 that are adjacent to one another, the thermal storage agent 2 shows less supercooling and allows uniform addition of various additives such as a thermal conduction improver, nucleating agent, and fire retarding agent. Particularly, when the oily gel bodies 1 are spherical, the oily gel bodies 1 are more easily aggregated than when the oily gel bodies 1 form an aggregate of particles of a variety of shapes, thereby allowing formation of a denser aggregate and even more uniform addition and mixture of the various additives.

Accordingly, suspension polymerization and suspension condensation polymerization are especially preferred as a manufacturing method of the oil absorbent resin, because those methods can produce spherical oil absorbent resin and thereby spherical oily gel bodies 1.

A particulate oil absorbent resin prepared by a method other than suspension polymerization and suspension condensation polymerization results in oily gel bodies 1 that form an aggregate of particles of a variety of shapes. Such oily gel bodies 1 are inferior to the spherical oily gel bodies 1 in uniformity upon the addition of the additives. Also, the oil absorbent resin needs to be crushed when made particulate, and therefore is likely to contain bubbles, resulting in the bubbles contained in the oily gel body 1.

The average particle diameter of the particulate oil absorbent resin as particles used in the present invention is preferably not more than 5 mm, more preferably not more than 3 mm, even more preferably not more than 1 mm. If the average particle diameter is not more than 5 mm, it takes less time to form continuous phase (continuum) of the oily gel bodies 1, improving the productivity. If the average particle diameter is not more than 1 mm, the continuous phase (continuum) of the oily gel bodies 1 can be easily formed at comparatively low temperatures without heating at high temperatures.

Any kind of the particulate oil absorbent resin can be used as long as it is such a body that the surface hardly dissolves and the particulate oily gel bodies 1 that are adjacent to one another have definite surfaces therebetween after absorption of the oil-soluble substance. A preferred example is a particulate oil absorbent resin that has been converted to have a high molecular weight or that has a crosslinking structure.

It can be confirmed that each of the oily gel bodies 1 has its own surface through, for example, the separation of the thermal storage agent 2, i.e. a continuum of the oily gel bodies 1, into individual oily gel bodies 1 when the thermal storage agent 2 is agitated in, for example, water.

Figure 2:
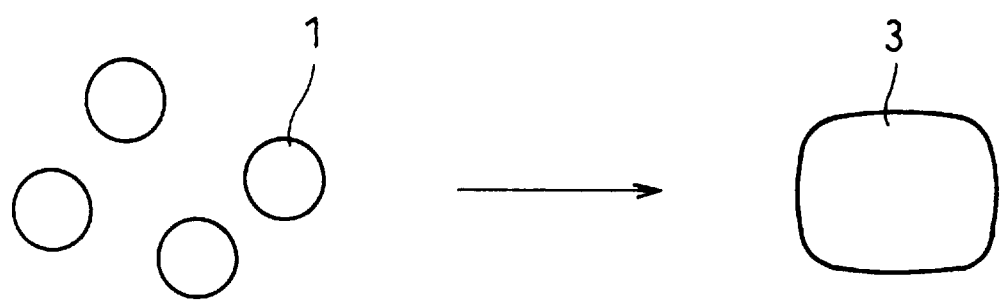
FIG. 2 is an illustration showing a conventional thermal storage agent.

If polyethylene pellets or SEBS (Styrene—ethylene/butylene—styrene block polymer) powder is used, that is, if a conventional oil absorbent resin is used, as shown in FIG. 2, when the oil absorbent resin absorbs oil-soluble substance and forms the oily gel body 1, the particulate oily gel bodies 1 contact one another, melt, and form an integral body, producing a bulky thermal storage agent 3.

When the thermal storage agent 3 is a large integral gel, oil-soluble substance may leak, because the oil-soluble substance is deformed by the change thereof in volume when the oil-soluble substance freezes and melts. Therefore, a definite surface cannot be found with the thermal storage agent 3.

The aforementioned oil absorbent resin can be manufactured by bulk polymerization. If the aforementioned oil absorbent resin is to be manufactured by bulk polymerization, the oil absorbent resin can be easily prepared by, for example, pouring the monomer components into a mold in the presence of a polymerization initiator and preferably heating up to temperatures of 50 to 150° C. The same polymerization initiators as described earlier can be used.

If bulk polymerization is employed, the oil absorbent resin may be prepared in bulk, or if necessary, in particles by adjusting the particle size of the obtained bulky product with an operation, for example, crushing. The oil absorbent resin may be also obtained in particles by mixing with a water-insoluble compound in a range that the oil absorbent resin would not degrade in the oil-soluble substance absorbing performance thereof for the purpose of improving the oil-soluble substance absorption rate of the oil absorbent resin.

The water-insoluble compound can be any compound that is hardly soluble in water, or soluble in water with solubility of not more than 1 g in 100 g of water at 20° C.

Specific examples of the water-insoluble compound include minerals such as silica, talc, and diatom earth; metals such as iron and aluminum; inorganic salts such as calcium carbonate, organic acid salts such as metal soap; and resins such as polystyrene, polyethylene, and polyvinyl acetate; organic compounds such as varnish; fibers such as cotton and pulp chips. Any one of these water-insoluble compounds can be used alone, or alternatively, a plurality of them can be used in combination if necessary.

Preferred among the water-insoluble compounds are those in powder form which, in a small quantity, can effectively prevent the oil absorbent resin from aggregation. Especially preferred are organic acid metal salts with solubility of not more than 1 g in 100 g of water at 20° C., and powder of hydrophobic inorganic compounds with a methanol value not more than 25 weight percent. A methanol value is a measure for hydrophobic degree of a water-insoluble compound, and expressed in volume percents of methanol present in methanol water solution in which the water-insoluble compound can be wet.

The unitary volume (continuum) of the oily gel body in the thermal storage agent in accordance with the present invention is preferably not less than 0.01 cm$^3$, more preferably not less than 10 cm$^3$, and even more preferably not less than 100 cm$^3$.

If the unitary volume of the oily gel body is less than 0.01 cm$^3$, the oil-soluble substance is in a supercooling state, causing inconvenience of not freezing at a target temperature or within a predetermined time. That is, if the unitary volume of the oily gel body is less than 0.01 cm$^3$, the oil-soluble substance is in a supercooling state, and the transformation from liquid phase to solid phase and vice versa becomes less likely to occur. Therefore not all the oily gel bodies freeze, resulting in incomplete extraction of the heat stored by heating or cooling. Besides, the oil-soluble substance separates from such an oily gel body after repeated process of freezing and melting.

By contrast, if the unitary volume of the oil-soluble substance is not less than 0.01 cm$^3$, since there is no supercooling of the oil-soluble substance, and the transformation from liquid phase to solid phase occurs in a short period of time, it is possible to obtain a thermal storage agent having a high freezing ratio in a short period of time and an extremely high thermal storage efficiency, compared with conventional thermal storage agents.

If the unitary volume of the oil-soluble substance is not less than 0.01 cm$^3$, the thermal storage agent is not only free from supercooling of the oil-soluble substance, but the oil-soluble substance may not separate at all, or if ever, only a small quantity thereof separates. Besides, when the oil-soluble substance is liquidized, or when the oil-soluble substance separates from the oily gel body, the thermal storage agent is free from leakage or fluidization of the oil-soluble substance, being much less likely to catch fire and spread (if ever caught fire).

That is, the thermal storage agent in accordance with the present invention is arranged to contain the aforementioned oily gel body such that the unitary volume of the oily gel body is not less than 0.01 cm$^3$. The unitary volume of the oily gel body represents the volume of a bulky oily gel body or oily gel bodies forming a continuous phase (continuum) through contact.

That is, the state in which the unitary volume of the oily gel bodies are not less than 0.01 cm$^3$ refers to, for example, a state in which the oily gel bodies form a bulk of various shapes, such as sheet, rectangular parallelepiped, sphere, and cylinder, or a state in which a plurality of the oily gel bodies composed of particles and very fine structures of less than 0.01 cm$^3$ are in contact with one another and consequently forms a continuous phase (continuum) of not less than 0.01 cm$^3$.

The state in which the oily gel bodies do not form a continuous phase (continuum) of not less than 0.01 cm$^3$ refers to a state in which a plurality of oily gel bodies composed of particles and very fine structures of less than 0.01 cm$^3$ are separated from one another by something other than the oily gel body components. An example of such a state can be found with a large quantity of water or metal powder forming a continuous phase (continuum) in which oily gel bodies less than 0.01 cm$^3$ are dispersed in tiny volume units.

The thermal storage agent may contain a substance other than oily gel body components in a range that can maintain the unitary volume of not less than 0.01 cm$^3$. Especially, if the thermal storage agent in accordance with the present invention further contains a nonflammable substance, the safety of the thermal storage agent can be improved further. Any nonflammable substance may be used, as long as it can reduce the quantity of combustion heat and prevent spread of fire. Preferred examples of such nonflammable substances include water and inorganic powder.

In the case when the thermal storage agent in accordance with the present invention contains a nonflammable substance, only on the condition that the thermal storage agent contains an enough quantity of oily gel body to generate a desired quantity of stored heat, the oily gel body and the nonflammable substance are preferably mixed for use in a ratio ranging from more than 0 weight percent to no more than 80 weight percent, and in a ratio ranging from not less than 20 weight percent to less than 100 weight percent respectively.

However, in view of the quantity of the stored heat of the prepared thermal storage agent per unit, the quantity of the oily gel body contained in the thermal storage agent is more preferably not less than 40 weight percent. If the noninflammable substance accounts for less than 20 weight percent, a noticeable effect of the addition of the noninflammable substance is unlikely to be obtained. In other words, the combustion heat of the thermal storage agent may be reduced less effectively.

In this manner, when the thermal storage agent contains a substance other than the oily gel body components, the thermal storage agent may be obtained, for example, by putting the oily gel bodies prepared by shredding or destroying particulate oily gel bodies or a bulky oily gel body into a noninflammable substance such as water, and then agitating the mixture as necessary, or by adding the noninflammable substance or aqueous gel bodies to particulate or bulky oily gel bodies, and then destroying, agitating, or mixing the mixture as necessary. In either case, the dispersion conditions or the mixture conditions are not especially limited as long as the oily gel body can maintain a unitary volume of not less than 0.01 cm³. Besides, the method of agitating and mixing the oily gel body with a substance other than oily gel body components is not especially limited either.

The thermal storage agent per se in accordance with the present invention can be used by cooling or heating for heat or cold storage; however, it may used in the form of a thermal storage device. That is, the thermal storage device in accordance with the present invention, including the aforementioned thermal storage agent, can be used, for instance, as a thermal storage material constituted by a container filled with the thermal storage agent, and can also be applied, for instance, to a variety of thermal storage systems with no modification made to the thermal storage agent or by, for example, first filling a container with the thermal storage agent to prepare a thermal storage material and then putting or immersing the thermal storage material in a water thermal storage tank. In short, the thermal storage device in accordance with the present invention is not limited in its physical shape or use, as long as it includes the thermal storage agent.

The container to be filled with the thermal storage agent has no restriction in particular manner as long as it has a structure that allows no leakage of the oil-soluble substance composing the oily gel body. Examples of such containers include sealed containers, containers which lets liquid such as water and gas such as air pass therethrough, and may other kinds of containers. Specific examples of material for these containers, depending upon the kinds of the oil-soluble substance, etc., include synthetic resins such as polyvinyl chloride, polypropylene, polyethylene, nylon, and polyurethane; natural fibers such as cotton, silk, and cellulose; and metals such as iron and aluminum. For example, if paraffin is used as the oil-soluble substance, polyvinyl chloride is preferably used as the material for the container.

The following are three methods of manufacturing the thermal storage material in accordance with the present invention: ① Let the oil absorbent resin absorb, and thus swell with, the oil-soluble substance in advance. Then fill the container with the obtained oily gel body and a noninflammable substance as necessary before sealing the container. ② Fill the container with the oil absorbent resin and the oil-soluble substance separately. Then let the oil absorbent resin absorb the oil-soluble substance in the container to prepare oily gel body. ③ Mix the oil absorbent resin and the oil-soluble substance, and then fill the container with that mixture under conditions that the mixture has fluidity (slurry state). Gel the mixture in the container to be in a state with less fluidity, or preferably eventually to lose the total fluidity thereof (oily gel body). Note that method ② is easier than method ①.

Method ③ is the most preferred of these methods to prepare a thermal storage material with excellent thermal conduction, because when a continuum of the oily gel body is formed, tile continuum is in close contact with one another in the container and can be easily formed, and bubbles are less likely to exist inside the thermal storage agent. The thermal storage agent in the container preferably has a unitary volume of 0.01 cm³ in this case also. If the unitary volume is 0.01 cm³ or less, the thermal storage agent shows supercooling, which is not desirable.

The thermal storage device of the thermal storage material, etc, in accordance with the present invention can take various shapes, such as plate, cylinder, rectangular parallelepiped, sphere, sausage, donut, and thick disc, depending on the use.

The above thermal storage device of the thermal storage material, etc. can contain a noninflammable substance, such as water or an inorganic hydrate salt, or another filling. For example, if the thermal storage material is floated on water, the specific gravity is adjustable by, filling inorganic powder or the like.

The thermal storage agent and the thermal storage material can be put or immersed in the water thermal storage tank or the like in any manner. Some examples of a variety of methods are (i) to put a bulk or particles of the oily gel body, as such, having a unitary volume of not less than 0.01 cm³ into the water thermal storage tank so as to float on, or be dispersed in, water, (ii) to let the spherical thermal storage material float on, or be dispersed in, water, (iii) to deposit plates of the thermal storage material in the water thermal storage tank with water passages retained therebetween, and (iv) to erect a cylinder or rectangular parallelepiped of the thermal storage material in the water thermal storage tank.

The quantities of the thermal storage agent and thermal storage material to fill or be immersed in the water thermal storage tank should be appropriately determined according to a target increase in heat quantity. Therefore, if the water thermal storage tank is divided into a plurality of cells, the thermal storage agent and thermal storage material can be put into all the cells, or only into some of the cells in limited quantities as necessary.

In this manner, although the thermal storage agent in accordance with the present invention can be used as such, the thermal storage agent can increase the quantity of the stored heat greatly when used as a thermal storage device.

As described above, a thermal storage agent in accordance with the present invention is arranged so as to contain an oily gel body composed of an oil absorbent resin and a thermal storage oil-soluble substance, wherein the unitary volume of the oily gel body equals or exceeds 0.01 cm³. In addition, the thermal storage agent in accordance with the present invention is arranged so that the oil-soluble substance is a compound that is thermal storing owing to the transformation from liquid phase to solid phase and vice versa.

Another thermal storage agent in accordance with the present invention is arranged so as to contain particulate oily gel bodies composed of a particulate oil absorbent resin and a thermal storage oil-soluble substance, wherein the oily gel bodies are in contact with one another without losing the individual surfaces thereof.

In the above thermal storage agents, the oil absorbent resins are preferably prepared by suspension polymerization or suspension condensation polymerization.

Even another thermal storage agent in accordance with the present invention is arranged so as to contain an oily gel body composed of a thermal storage oil-soluble substance and an oil absorbent resin with an equilibrium absorption ratio not less than 3 g/g at a temperature of (X+10) ° C. with respect to the oil-soluble substance, X representing the melting point of the oil-soluble substance in degrees centigrade, wherein the unitary volume of the oily gel body equals or exceeds 0.01 cm³. Especially when the oil-soluble substance is pentadecane, the temperature at which the equilibrium absorption ratio is not less than 3 g/g is preferably 25° C.

A thermal storage device in accordance with the present invention is arranged so as to contain one of the above-mentioned thermal storage agents. A thermal storage material in accordance with the present invention is arranged so as to be prepared by filling a container with one of the above-mentioned thermal storage agents.

A manufacturing method of a thermal storage material in accordance with the present invention includes steps of first mixing an oil absorbent resin and a thermal storage oil-soluble substance, then filling a container with the mixture in a state in which the mixture has fluidity, and gel the mixture in the container to lower the fluidity of the mixture, preferably, down to zero.

With the arrangement, since supercooling of the oil-soluble substance does not occur, it is possible to obtain a thermal storage agent with a high thermal storage efficiency. Besides, since the oily gel body contains an oil absorbent resin and a thermal storage oil-soluble substance, the oil-soluble substance does not separate at all, or if ever, only a small quantity thereof separates from the oily gel body.

Therefore, when the oil-soluble substance is liquidized, or when the oil-soluble substance separates from the oily gel body, the thermal storage agent is highly safe with no leakage and fluidization of the oil-soluble substance and much fewer chances of catching fire or spreading (if ever caught fire). In addition, since supercooling of the oil-soluble substance does not occur, and the transformation from liquid phase to solid phase occurs in a shorter period of time, it is possible to obtain a thermal storage agent having a much higher thermal storage efficiency than conventional thermal storage agents.

Besides, since the oily gel bodies remain particulate or preferably spherical, when the oil-soluble substance freezes and melts, the change in volume is buffered, and the leakage of the oil-soluble substance from the oily gel bodies is restrained. In addition, since the thermal storage agent is an aggregate (continuum) of particulate oily gel bodies, even if the oil-soluble substance leaks from one of the oily gel bodies composing the thermal storage agent, the net leakage of the oil-soluble substance from the thermal storage agent is also restrained, because the oily gel bodies adjacent to that oily gel body absorb the leaking oil-soluble substance. In addition, since empty spaces are formed by the oily gel bodies that are adjacent to one another, supercooling is restrained, and various additives can be added uniformly.

Moreover, the thermal storage agent can be impregnated with the oil-soluble substance at comparatively low temperatures, the oily gel bodies, i.e., the thermal storage agent in accordance with the present invention, can be manufactured at comparatively low temperatures, and the oil-soluble substance is prevented from separating from the oily gel body. Therefore, the resultant thermal storage agent is much safer with less leakage of the oil-soluble substance, far fewer chances of catching fire and spreading (if ever caught fire), compared to conventionally prepared counterparts. In addition, since the equilibrium absorption ratio of the oil absorbent resin is not less than 3 g/g with respect to an oil-soluble substance, the thermal storage agent using the oil absorbent resin has a greater quantity of latent heat, and therefore is superior in thermal storage efficiency. Moreover, the thermal storage device and thermal storage material containing the thermal storage agent have good thermal storage efficiency and excellent safety.

According to the method, when a continuum of the oily gel body is formed, since the continuum can be easily formed in close contact with one another in the container, bubbles are less likely to exist inside the thermal storage agent. This can improve the adhesion to a thermally conductive surface in a device for cooling or heating an obtained oily gel body as a thermal storage agent, and produce a thermal storage material with excellent thermal conduction.

The thermal storage agent, device and material in accordance with the present invention are applicable in various fields such as air-conditioning systems and water supplying facilities for buildings, heat and cold storage for food and chemical plants, construction material for floor heating and wall heating, cold and hot transportation systems, and solar heat collectors.

The following description will discuss the present invention further in detail by way of examples and comparative examples, which by no means limit the scope of the present invention. The freezing ratio of pentadecane present in the thermal storage material were calculated according to the equation:

$$\text{Freezing Ratio of Pentadecane } (\%) = (A-S)/(A-B) \times 100$$

where A represents the theoretical lowest temperature (° C.) that can be reached by the sensible heat of vinyl chloride and the thermal storage agent, B represents the theoretical lowest temperature (° C.) that can be reached by the total amount of the sensible heat of vinyl chloride and thermal storage agent, and the melting latent heat on the assumption that 100% of pentadecane was freezed, and S represents the actually measured lowest temperature (° C.).

Note that "parts" throughout the following examples and comparative examples represents "parts by weight".

FIRST EXAMPLE

A tray-shaped glass casting mold for polymerization having dimensions of 10 cm×10 cm×1 cm fitted with a thermometer and a gas introductory tube was charged with a mixed solution of 59.762 parts of isobutylmethacrylate (SP value; 7.5), 39.842 parts of stearilacrylate (SP value; 7.9) as monomers (A), 0.396 parts of 1,6-hexandiol diacrylate as a crosslinking monomer, and 0.1 parts 2,2'-azobisdimethylvaleronitrile as a polymerization initiator. The mixed solution was heated under nitrogen gas stream to a temperature of 50° C. and maintained at that temperature for 2 hours, and thereafter heated to a temperature of 80° C. and maintained at that temperature for 2 hours, so as to carry out a polymerization reaction.

After the reaction was completed, the obtained gel product was left to cool down, and then peeled off the mold to obtain the oil absorbent resin. An oily gel body as a thermal storage agent (hereinafter will be referred to as thermal storage agent (1)) was prepared by immersing 20 parts of the obtained oil absorbent resin in 80 parts of pentadecane (freezing point; 10° C.) as an oil-soluble substance at a temperature of 60° C. for 48 hours, so that the oil absorbent resin would absorb, and swell with, pentadecane.

Next, a transparent glass container was filled with 200 g of thermal storage agent (1), and placed in a thermostat tank, where pentadecane was subjected to 20 times of freezing and melting according to a time program in which 2° C.×8 hours and 30° C.×8 hours were designated as one cycle. Then the separation of pentadecane from thermal storage agent (1) was visually checked. The result is shown in Table 1.

SECOND EXAMPLE

A flask of a 500-ml capacity fitted with a thermometer, a stirrer, and a gas introductory tube was charged with 3 parts of gelatin as a protective colloid agent dissolved in 300 parts of water. The air inside the flask was replaced with nitrogen, and the water solution in the flask was heated to a temperature of 40° C. under nitrogen stream with continuous stirring. Meanwhile, a mixed solution was prepared by mixing 99.823 parts of dodecyl acrylate (SP value; 7.9) as monomer (A), 0.177 parts of ethyleneglycoldiacrylate as a crosslinking monomer, and 0.5 parts of benzoyl peroxide as a polymerization initiator. Thereafter the mixed solution was all added into the flask simultaneously and stirred at 400 rpm to prepare a homogeneous solution. Next, the temperature in the flask was raised to 80° C., and the solution was stirred at that temperature for 2 hours. The temperature in the flask was further raised to 90° C., and the solution was stirred at that temperature for 2 hours, so as to carry out a polymerization reaction.

After the reaction was completed, the obtained particulate reaction product was filtered, cleaned with water, and then dried at a temperature of 60° C., so as to prepare an oil absorbent resin with particle diameters ranging from 100 μm to 1000 μm. An oily gel body as a thermal storage agent (hereinafter will be referred to as thermal storage agent (2)) was prepared by immersing 10 parts of the obtained oil absorbent resin in 90 parts of pentadecane at room temperature for 2 hours, so that the oil absorbent resin would absorb, and swell with, pentadecane.

Next, the separation of pentadecane from thermal storage agent. (2) was visually checked, using thermal storage agent (2), in the same manner as in the first example. The result is shown in Table 1.

THIRD EXAMPLE

A thermal storage agent containing a continuum phase of oily gel bodies having a unitary volume of not less than 0.027 cm³ (hereinafter will be referred to as thermal storage agent (3)) was prepared by cutting 150 g of thermal storage agent (1) prepared in the first example into cubes having 3-mm long sides, and adding and gently mixing the cubes in 50 g of calcium carbonate as a water-insoluble compound for 1 minute.

Next, the separation of pentadecane from thermal storage agent (3) was visually checked, using thermal storage agent (3), in the same manner as in the first example. The result is shown in Table 1.

FOURTH EXAMPLE

An oily gel body as a thermal storage agent (hereinafter will be referred to as thermal storage agent (4)) was prepared by immersing 20 parts of polynorbornene particulate oil absorbent resin having an average particle diameter of 500 μm (product name: NORSOREX, available from CdF Chemie of France) in 80 parts of pentadecane at room temperature for 2 hours, so that the oil absorbent resin would absorb, and swell with, pentadecane.

Next, the separation of pentadecane from thermal storage agent (4) was visually checked, using thermal storage agent (4), in the same manner as in the first example. The result is shown in Table 1.

FIFTH EXAMPLE

An oily gel body as a thermal storage agent (hereinafter will be referred to as thermal storage agent (5)) was prepared by immersing 20 parts of the particulate oil absorbent resin prepared in the second example in 80 parts of paraffin wax (Product No. 130, available from Nippon Seiro Co., Ltd.; freezing point, 55° C.) at a temperature of 80° C. for 24 hours as an oil-soluble substance, so that the oil absorbent resin would absorb, and swell with, paraffin wax.

Next, a transparent glass container was filled with 200 g of thermal storage agent (5), and placed in a thermostat tank, where paraffin wax was subjected to 20 times of freezing and melting according to a time program in which 40° C.×8 hours and 70° C.×8 hours were designated as one cycle. Then, the separation of pentadecane from thermal storage agent (5) was visually checked. The result is shown in Table 1.

First Comparative Example

A flask of the same kind as that of the second example was charged with 180 g of pentadecane and heated to a temperature of 90° C. under nitrogen stream with continuous stirring. A thermal storage agent for comparison using no oil absorbent resin (hereinafter will be referred to as thermal storage agent (6)) was prepared by adding 20 g of 12-hydroxy stearic acid as a gelling agent into the flask, stirring the mixture at 300 rpm for 5 minutes, and cooling the mixture.

Next, the separation of pentadecane from thermal storage agent (6) was visually checked, using thermal storage agent (6), in the same manner as in the first example. The result is shown in Table 1.

Second Comparative Example

A flask of the same kind as that of the second example was charged with 180 g of pentadecane and heated to a temperature of 140° C. under nitrogen stream with continuous stirring. A thermal storage agent for comparison using no oil absorbent resin (hereinafter will be referred to as thermal storage agent (7)) was prepared by adding 20 g of an amino acid oil gelling agent (Product Name GP-1, available from Ajinomoto Co., Ltd.) into the flask, stirring the mixture at 300 rpm for 2 hours, and cooling the mixture.

Next, the separation of pentadecane from thermal storage agent (7) was visually checked, using thermal storage agent (7), in the same manner as in the first example. The result is shown in Table 1.

TABLE 1

| | Thermal Storage agent | Separation | Oil-soluble substance |
|---|---|---|---|
| Ex. 1 | (1) | No | Pentadecane |
| Ex. 2 | (2) | No | Pentadecane |
| Ex. 3 | (3) | Very Little | Pentadecane |
| Ex. 4 | (4) | Very Little | Pentadecane |
| Ex. 5 | (5) | Very Little | Paraffin wax |
| Comparative Ex. 1 | (5) | Large | Pentadecane |
| Comparative Ex. 2 | (6) | Large | Pentadecane |

SIXTH EXAMPLE

A thermal storage material (hereinafter will be referred to as thermal storage material (I)) was prepared by filling a polyvinyl chloride cylindrical pipe having a diameter of 4 cm and a height of 25 cm with thermal storage agent (3) prepared in the third example, and plugging up the pipe at each end thereof with a polyvinyl chloride stopper.

Thermal storage material (I), after being immersed for 5 hours in a thermal storage water tank of which the temperature was maintained at 7° C., was placed in a Dewar bottle that had been charged in advance with 600 ml of water of 30° C. The water in the Dewar bottle was measured for the lowest temperature, and the freezing ratio of pentadecane was calculated according to the equation mentioned above. The result is shown in Table 2.

SEVENTH EXAMPLE

A thermal storage material containing a continuum phase of oily gel bodies having a unitary volume of about 260 cm$^3$ (hereinafter will be referred to as thermal storage material (II)) was prepared by filling a container of the same kind as the polyvinyl chloride cylindrical pipe used in the sixth example with 200 g of thermal storage agent (2) prepared in the second example.

The freezing ratio of pentadecane present in thermal storage material (II) was calculated, using thermal storage material (II), in the same manner as in the sixth example. The result is shown in Table 2.

TABLE 2

|  | Thermal Storage material | Freezing Ratio (%) |
|---|---|---|
| Ex. 6 | (I) | 95 |
| Ex. 7 | (II) | 100 |
| Ex. 8 | (III) | 90 |
| Ex. 9 | (IV) | 100 |
| Comparative Ex. 3 | (V) | 10 |

EIGHTH EXAMPLE

A thermal storage agent having a structure in which aqueous gel bodies were dispersed in a continuum phase of oily gel bodies having a unitary volume of about 180 cm$^3$ (hereinafter will be referred to as thermal storage agent (8)) was prepared by adding an aqueous gel body obtained in advance from the absorption of 59 g of water by 1 g of a water absorbent resin (Product Name AQUALIC, available from Nippon Shokubai Co., Ltd.) to 140 g of thermal storage agent (2) prepared in the second example, and gently mixing for 1 minute.

A thermal storage material (hereinafter will be referred to as thermal storage material (III)) was prepared by filling a container of the same kind as the polyvinyl chloride cylindrical pipe used in the sixth example with thermal storage agent (8).

The freezing ratio of pentadecane present in thermal storage material (III) was calculated, using thermal storage material (III), in the same manner as in the sixth example. The result is shown in Table 2.

NINTH EXAMPLE

A fluid slurry was prepared by gently mixing 10 parts of the particulate oil absorbent resin prepared in the second example, 70 parts of pentadecane as an oil-soluble substance, and 20 parts of calcium carbonate as an incombustible substance for 1 minute. Next, a polyvinyl chloride cylindrical pipe, having a diameter of 4 cm and a height of 25 cm, with a polyvinyl chloride stopper melted and attached to a lower segment of the pipe was filled with 200 g of that slurry in a liquid state. Thereafter, a non-fluid thermal storage material containing a continuum phase of oily gel bodies having a unitary volume of about 204 cm$^3$ (hereinafter will be referred to as thermal storage material (IV)) was prepared by melting and attaching another polyvinyl chloride stopper to an upper segment of the pipe, and leaving the pipe for 10 minutes.

Next, the freezing ratio of pentadecane present in thermal storage material (IV) was calculated, using thermal storage material (IV), in the same manner as in the sixth example. The result is shown in Table 2.

Third Comparative Example

After heating a water solution of 1.5 parts of polyoxyethylene alkylether (Product Name SOFTANOL 120, available from Nippon Shokubai Co., Ltd.) as surface active agents and 4.0 g of λ-carrageenan dissolved in 150 g of water up to a temperature of 80° C., 0.3 g of potassium chloride was added as an incombustible substance, and mixed at a temperature of 75° C. for 10 minutes. The water solution was cooled down to a temperature of 55° C., and 100 g of thermal storage agent (2) prepared in the second example was mixed with, and homogeneously dispersed in, the water solution. The water solution was further cooled down quickly with cold water to obtain a thermal storage agent (9) for comparison having a structure in which oily gel bodies were dispersed to as minuscule a unitary volume as not more than 0.005 cm$^3$.

Thereafter, a thermal storage material (hereinafter will be referred to as thermal storage material (V)) was prepared by filling a container of the same kind as the polyvinyl chloride cylindrical pipe used in the sixth example with thermal storage agent (9). Next, the freezing ratio of pentadecane present in thermal storage material (V) was calculated, using thermal storage material (V), in the same manner as in the sixth example. The result is shown in Table 2.

As is clear from the results shown in Tables 1 and 2, the thermal storage agents prepared in these examples exhibit no separation, or if any, very little separation of the oil-soluble substance.

Especially, if the oil absorbent resin of a thermal storage agent in accordance with the present invention is particulate oily gel bodies, the thermal storage agent 2 is in a state in which, as shown in FIG. 1, the oily gel bodies 1 are in contact with one another without losing the individual surfaces thereof. Therefore, the thermal storage agent 2 always has empty spaces between the oily gel bodies 1. The empty spaces buffer a change in volume of the oil-soluble substance when the oil-soluble substance freezes and melts, and restrain the leakage of the oil-soluble substance from the oily gel bodies 1.

Besides, if a thermal storage material is manufactured, as described above, by first mixing the particulate oil absorbent resin with the oil-soluble substance and then filling a container with the mixture in a state in which the mixture has fluidity, the oil absorbent resin absorbs the oil-soluble substance, becomes particulate oily gel bodies, and becomes a thermal storage agent in a state in which the oily gel bodies are in contact with one another and have lower fluidity, or preferably, no fluidity. The thermal storage agent is superior because of the thermal conductivity thereof, since the thermal storage agent produces few bubbles therein and near a thermal conducting surface thereof.

Accordingly, it is understood that the thermal storage agent can prevent the leakage and fluidization of the oil-soluble substance. Besides, since the thermal storage material using the thermal storage agent has an extremely high freezing ratio in comparison with conventional thermal storage materials, the thermal storage material in accordance with the present invention is superior in thermal storage efficiency to conventional thermal storage materials.

The following description will discuss another embodiment in accordance with the present invention.

Another manufacturing method of a thermal storage agent in accordance with the present invention includes the step of polymerizing a monomer component in a thermal storage oil-soluble substance, preferably, in the presence of an oil-soluble radical polymerization initiator, whereby the oil-soluble substance is held in a polymer prepared by polymerizing the monomer component so as to lower the fluidity of the oil-soluble substance that is liquidized due to a phase transformation. Besides, it is preferred to select such a combination that the polymer prepared from the monomer component and the oil-soluble substance basically have compatibility (similar to each other in terms of polarity).

In the thermal storage agent, the polymer prepared by polymerizing the monomer component preferably has a crosslinking structure to more stably maintain the state in which the oil-soluble substance is held. To provide such a crosslinking structure for the polymer, the monomer component preferably has a crosslinking monomer containing at least two polymeric unsaturated groups per molecule or a reactive monomer having a functional group for crosslink formation.

When the monomer component has a reactive monomer, the polymer with a crosslinking structure can be formed by crosslinking the polymer prepared by copolymerizing the monomer component in the oil-soluble substance between the functional groups with a crosslinking agent in a state in which the oil-soluble substance is contained.

The thermal storage oil-soluble substance is not limited in any particular manner, as long as the thermal storage oil-soluble substance, at a temperature near room temperature (25° C.) and under normal pressure (1 atm), is oily, allows neither the polymerization of the monomer component nor the crosslinking of the polymer to be interrupted, and can store and release thermal energy such as stored sensible heat, stored latent heat, and stored chemical reaction heat. However, a preferred substance should have a high thermal storage density and a capability to store and release heat at around a certain temperature, and therefore it is preferable that the substance has, as thermal storing property, stored latent heat exploiting the latent heat generated during a phase transformation or a phase transition.

Such oil-soluble substances that can store latent heat are, as examples, hydrocarbon compounds such as alcohols, esters, ethers, and paraffins. Preferred among these are paraffins, especially pentadecane as a paraffin.

This is because paraffin easily dissolves the monomer component and the polymer, does not also interrupt the crosslinking of the polymer (since paraffin does not react with multifunctional compounds during the polymerization of the monomer component or the crosslinking of the polymer), is readily available, and permits simple and stable manufacture of a thermal storage agent applicable in wide ranges of temperature.

The reason for the simple and stable manufacture of the thermal storage agent is that paraffins having different structures offer a wide range of melting points, and paraffins having various melting points can be chosen.

Specific examples of the aforementioned hydrocarbon compounds are intermediate paraffins which are liquid at room temperature, such as $C_{14}$ to $C_{16}$ paraffins, $C_{15}$ to $C_{16}$ paraffins, pentadecane, $C_{14}$ paraffin, and $C_{16}$ paraffin, higher paraffins which are solid at room temperature, and higher alcohols such as 1-decanol.

Examples of the oil-soluble radical polymerization initiator includes the organic peroxide and azo compounds, both being described above. The oil-soluble radical polymerization initiators can be topically used in a range of 0.1 to 1.5 weight percent to the monomer component. The polymerization temperature, depending upon the melting point of the oil-soluble substance and the kinds of the monomer component and the polymerization initiator, should be chosen between 0 to 150° C., and the oil-soluble substance utilized needs to remain liquid at that chosen temperature. Preferred polymerization temperatures are from 0 to 80° C.

The monomer component is, for example, a monomer component having a monomer (f), as the main component, that contains a single polymeric unsaturated group per molecule, and the aforementioned crosslinking monomer (b) that contains at least two polymeric unsaturated groups per molecule.

The mixture ratio of the monomer (f) and the crosslinking monomer (b) to the total amount of those monomers (f) and (b) is preferably between 96 to 99.999 weight percent for the monomer (f) and 0.001 to 4 weight percent for the crosslinking monomer (b) (Note that the monomer (f) and crosslinking monomer (b) adds up to 100 weight percent).

The monomer (f) is, for example, a monomer that exhibits a solubility parameter (SP value) not more than 9 and that contains at least one single polymeric unsaturated group per molecule, such as an unsaturated carboxylic acid ester, a (meth)acryl amide containing a hydrocarbon group, an α-olefin, an alicyclic vinyl compound, an allyl ether containing an aliphatic hydrocarbon group, a vinyl ester containing an aliphatic hydrocarbon, vinyl ether containing an aliphatic hydrocarbon, or an aromatic vinyl compound. Any one of these monomers can be used alone, or alternatively, a plurality of them can be used in combination if necessary.

Examples of the unsaturated carboxylic acid ester include methyl(meth)acrylate, ethyl(meth)acrylate, propyl(meth)acrylate, butyl(meth)acrylate, isobutyl(meth)acrylate, t-butyl(meth)acrylate, 2-ethylhexyl(meth)acrylate, n-octyl(meth)acrylate, dodecyl(meth)acrylate, stearil(meth)acrylate, phenyl(meth)acrylate, octylphenyl(meth)acrylate, nonylphenyl(meth)acrylate, dinonylphenyl(meth)acrylate, cyclohexyl(meth)acrylate, menthyl(meth)acrylate, isobornyl(meth)acrylate, dibutyl(meth)acrylate, dibutylmaleate, didodecylmaleate, dodecylcrotonate, and didodecylitaconate.

Examples of the (meth)acrylamide containing a hydrocarbon group include (di)butyl(meth)acrylamide, (di)dodecyl(meth)acrylamide, (di)stearil(meth)acrylamide, (di)butylphenyl(meth)acrylamide, and (di)octylphenyl(meth)acrylamide.

Examples of the α-olefin include 1-hexane, 1-octane, isoctane, 1-nonane, and 1-decane. An examples of the alicyclic vinyl compound is vinyl cyclohexane. An example of the allyl ether containing a hydrocarbon group is dodecylallylether.

Examples of the vinyl ester containing a hydrocarbon group include caproic acid vinyl, lauric acid vinyl, palmitin acid vinyl, and stearic acid vinyl. Examples of the vinyl ether containing a hydrocarbon group include butyl vinyl ether, and dodecyl vinyl ether. Examples of the aromatic vinyl compound include styrene, t-butylstyrene, and octylstyrene.

Especially preferred among these as a monomer that imparts a resulting polymer with a superior property to hold the oil-soluble substance in a gel or solid state by lowering the fluidity of the liquidized oil-soluble substance is the monomer (f) containing at least one aliphatic hydrocarbon group of a carbon number from 1 to 30 and also containing, as the main component, at least one kind of unsaturated compound selected from alkyl(meth)acrylate, alkylaryl(meth)acrylate, alkyl(meth)acrylamide, alkylaryl(meth)acrylamide, aliphatic vinyl ester, alkylstyrenes, and α-olefin.

The crosslinking monomer (b) is a monomer containing at least two polymeric unsaturated monomers per molecule, and examples of such crosslinking monomers can be found above.

Examples of a monomer component other than the aforementioned monomer components include a monomer component containing the monomer (f) as the main component, a functional group that forms a chemical bond with the crosslinking agent (will be explained later in detail), and a reactive monomer (c) having a single polymeric unsaturated group.

The mixture ratio of the monomer (f) and the reactive monomer (c) to the total amount of the monomers (f) and (c) is preferably between 90 to 99.995 weight percent for the monomer (f) and 0.005 to 10 weight percent for the reactive monomer (c) (Note that the monomer (f) and reactive monomer (c) adds up to 100 weight percent).

The reactive monomer (c) should be a compound containing a condensing functional group (X) that forms a chemical bond as being condensed with a condensing functional group (Y) present in the later-mentioned crosslinking agent. Examples of such a condensing functional group (X) includes a carboxyl group, a hydroxyl group, a mercapt group, a nitrile group, an amino group, an amide group, an isocyanate group, an epoxy group, and a polymeric unsaturated group of an anhydride acid.

Examples of the reactive monomer (c) include a vinyl monomer containing a carboxyl group, a vinyl monomer containing a hydroxyl group, a vinyl monomer containing a mercapt group, a vinyl monomer containing a nitrile group, a vinyl monomer containing an amino group, a vinyl monomer containing an amide group, a vinyl monomer containing an isocyanate group, a vinyl monomer containing an epoxy group, and an anhydride acid containing a polymeric unsaturated group. Any one of these monomers can be used alone, or alternatively, a plurality of them can be used in combination if necessary.

Examples of the vinyl monomer containing a carboxyl group include (meth)acryl acid, fumaric acid, and itaconic acid. Examples of the vinyl monomer containing a hydroxyl group include hydroxyethyl(meth)acrylate, polyethyleneglycol(meth)acrylate, propyleneglycol mono(meth)acrylate, polypropyleneglycol mono(meth)acrylate, glycerin (meth)acrylate, trimethylol propane(meth)acrylate, and hydroxystyrene.

Examples of the vinyl monomer containing a mercapt group include vinyl mercaptan, and mercapt ethyl(meth)acrylate. Examples of the vinyl monomer containing a nitrile group include (meth)acrylnitrile. Examples of the vinyl monomer containing an amino group include amino ethyl (meth)acrylate and vinyl pyridine.

Examples of the vinyl monomer containing an amide group include (meth)acrylamide. Examples of the vinyl monomer containing an isocyanate group include vinyl isocyanate. Examples of the vinyl monomer containing an epoxy group include glycidyl (meth)acrylate. Examples of an anhydride acid containing a polymeric unsaturated group include maleic anhydride.

The crosslinking agent contains at least two condensing functional groups (Y) per molecule, and is suitably selected in accordance with the condensing functional group (X) present in the polymer. Examples of such a crosslinking agent are phenol resins, such as dimethylol phenol and polymethylol phenol, that can be condensed when the condensing functional group (X) is a carboxyl group, a mercapt group, a nitrile group, or an epoxy group.

Other examples of the crosslinking monomer are amino resins that are prepared by the addition condensation of an amino compound, such as melamine, benzoguanamine, and urea, and formaldehyde or alcohol, and can be condensed when the condensing functional group (X) is a carboxyl group or hydroxyl group.

Even other examples of the crosslinking agent are polyamino compounds, such as hexamethylenediamine, diethylenetriamine, and tetraethylenepentamine, that can be condensed when the condensing functional group (X) is a carboxyl group, an isocyanate group, or an epoxy group.

Still other examples of the crosslinking agent are isocyanate compounds, such as hexamethylene diisocyanate, isophorone diisocyanate, p-phenylene diisocyanate, 2,4-toluene diisocyanate, 2,6-toluene diisocyanate, 1,5-naphthalene diisocyanate, and blocked isocyanates prepared by condensing these isocyanates with methanol and phenol, that can be condensed when the condensing functional group (X) is a carboxyl group, a hydroxyl group, a mercapt group, an isocyanate group, an amino group, an amide group, or an epoxy group.

Still other examples of the crosslinking agent are polycarboxylic acids, such as malonic acid, succinic acid, adipic acid, phthalic acid, and terephthalic acid, that can be condensed when the condensing functional group (X) is an isocyanate group or an epoxy group.

Still other examples of the crosslinking agent are acids anhydride, such as phthalic anhydride, pyromellitic anhydride, and benzophenone tetracarboxylic anhydride, that can be condensed when the condensing functional group (X) is a hydroxyl group, an isocyanate group, or an epoxy group.

Still other examples of the crosslinking agent are aldehyde compounds, such as glyoxal and terephthalic aldehyde, that can be condensed when the condensing functional group (X) is a hydroxyl group, a mercapt group, an amino group, or an amide group.

Still other examples of the crosslinking agent are polyhydric alcohols, such as ethylene glycol, diethylene glycol, propylene glycol, and hexane diol, that can be condensed when the condensing functional group (X) is a hydroxyl group, an isocyanate group, or an epoxy group.

Still other examples of the crosslinking agent are epoxy compounds, such as toluene glycidyl ether, hexamethylene glycidyl ether, bisphenol A diglycidyl ether, and polypropylene glycol diglycidyl ether, that can be condensed when the condensing functional group (X) is a carboxyl group, a hydroxyl group, a mercapt group, or an isocyanate group.

The kind of the condensing functional group (X) present in the polymer dictates the combination of the above compounds as crosslinking agents; any one of them can be used alone, or alternatively, a plurality of them can be used in combination if necessary.

Preferred combinations of the condensing functional group (X) and the condensing functional group (Y) present in the crosslinking agent are those of at least one functional group selected from a carboxyl group, a hydroxyl group, a mercapt group, an amino group, and an amide group, and at least one functional group selected from an isocyanate group, an epoxy group, and a carboxylic anhydride group.

A polymer containing a reduced amount of unreacted residual functional groups can be formed by selecting the condensing functional group (X) and the condensing functional group (Y) from the above combinations. Therefore, a thermal storage agent that does not interrupt the thermal storing property of the oil-soluble substance can be formed by letting the polymer hold the oil-soluble substance.

It becomes possible to gel the oil-soluble substance at low temperatures by selecting a combination of a hydroxyl group as the condensing functional group (X) and an isocyanate as the condensing functional group (Y), i.e., a combination of the reactive monomer containing a hydroxyl group and the crosslinking agent containing at least two isocyanate groups per molecule. Therefore, it is possible to hold the oil-soluble substance in a gel state in a non-heat-resistant container, and obtain a thermal storage agent with superior long term stability.

The ratio of the crosslinking agent to the polymer being crosslinked is determined by the number of moles of the condensing functional groups (X) which are structural units of the polymer, and the number of moles of the condensing functional groups (Y) present in the crosslinking agent, preferably being in a range of 0.1 to 10, expressed in ratio of the number of moles of the condensing functional groups (Y) per 1 mole of the condensing functional groups (X).

If the ratio of the number of moles of the condensing functional groups (Y) per 1 mole of the condensing functional groups (X) is less than 0.1, only a weak crosslinked polymer may be obtained due to insufficient crosslinking, which is not desirable. By contrast, if the ratio of the number of moles of the condensing functional groups (Y) per 1 mole of the condensing functional groups (X) is more than 10, a crosslinked polymer with superior property of holding a large amount of oil-soluble substance may not be obtained, which is not desirable.

A useful thermal storage agent can be formed, using these crosslinking agents, by the following process; mix a crosslinking agent and an uncrosslinked polymer prepared by polymerizing a monomer component, then pour the mixture into, for example, a container before the crosslinking reaction proceeds, and subject the mixture to a crosslinking reaction at a temperature between 0 to 80° C. at which temperature the oil-soluble substance melts and can maintain the liquid state thereof. The rate of reaction can be increased by selectively using a catalyst that accelerates the various polymerization reactions and crosslinking reactions, if necessary.

Besides, a compound containing a reactive group that can be polymerized and condensed with the condensing functional group (X) or the condensing functional group (Y) may be added in advance or after the crosslinking reaction in a amount that does not negatively affect the crosslinking reaction in order to prevent the condensing functional group (X) and the condensing functional group (Y) from being left unreacted. For example, if the condensing functional group (X) or the condensing functional group (Y) is polyisocyanate, a long-chained carboxylic acid can be used as the above compound. The condensing functional group (X) and the condensing functional group (Y) being left unreacted is not desirable due to the possible negative effect thereof on the thermal storing property of the oil-soluble substance.

In another embodiment of the present invention, the monomer (f), present in the monomer components, that exhibits a solubility parameter (SP value) not more than 9 is used in an amount of not less than 50 weight percent, and preferably, not less than 70 weight percent with respect to the total amount of the monomer components. If the monomer (f) is used in an amount of less than 50 weight percent, the content ratio of the oil-soluble substance that can be held in the resultant thermal storage agent may be largely reduced, which is not desirable.

In the case described above, the monomer (f) that exhibits a solubility parameter (SP value) of not more than 9 needs to be present in an amount of not less than 50 weight percent in the monomer components. Alternatively, the monomer components may further contain less than 50 weight percent of a monomer that is neither the crosslinking monomer (b) nor the reactive monomer (c) and that has a single polymeric unsaturated group in a molecule of a solubility parameter (SP value) of more than 9.

Examples of such a monomer include methoxypolyethylene glycol (meth)acrylate and phenoxypolyethylene glycol (meth)acrylate.

The manufacturing method of a thermal storage agent in accordance with the present invention can employ a method of suspension polymerization (suspension polymerization in water) in the co-presence of the aforementioned oil-soluble radical polymerization initiator in a state in which the oil-soluble substance and the monomer components are dissolved, mixed, and suspended in an aqueous solvent.

When, for example, suspension polymerization is employed in an aqueous solvent such as water in this manner, the suspension polymerization is carried out by dispersing the monomer components in a solution prepared by dissolving a protective colloid agent, a surface active agent, etc. in an aqueous media such as water, for example, a water solution of a surface active agent, in a state of suspended particles, and polymerizing the monomer components with an oil-soluble radical polymerization initiator. Note that, if necessary, the monomer components may be first dissolved in a water-insoluble organic solvent to form a solution which is subjected to suspension polymerization in an aqueous solvent.

Examples of the protective colloid agent include polyvinyl alcohol, hydroxyethylene cellulose, and gelatin. Examples of the surface active agent include sodium alkyl sulfonic acid, sodium alkylbenzene sulfonic acid, polyoxyethylene alkylether, and soap of a fatty acid.

In the manufacturing method of a thermal storage agent in accordance with the present invention, an additive may also be added. Examples of additives for improving the thermal conduction include metal (iron, copper, etc.) powder, metal fiber, metal oxide, carbon, and carbon fiber. Examples of additives for adjusting the specific gravity include sand, clay, stone, and metal (lead, iron, etc.) powder.

Additives for providing fire retardation include water, water gel, metal powder, inorganic compounds (e.g., calcium carbonate), and fire retarding agents (bromides, chlorides, phosphorous, etc.). Some of fire retardation effects are lower chances of combustion, prevention of fire from spreading, elimination of flashing point by water vapor, and a reduced heat quantity in combustion.

Other additives include metal powder and high polymer paraffins (waxes) for the prevention of supercooling, waxes for the adjustment of the freezing point, and oxidation preventive agents (phenol, thio, phosphorous, etc.) for the prevention of oxidation and deterioration over a long period of time. Other additives such as coloring agents, pigments, electric charge preventive agents, and antibacterial agents may be further added if necessary.

A clathrate compound for adjusting the latent heat of the oil-soluble substance may be added as an additive to the oil-soluble substance. Examples of the clathrate compound include $C_4H_8.O.17H_2O$, $(CH_3)_3N.10.25H_2O$, $(C_4H_9)_4NCHO_2.32H_2O$, and $(C_4H_9)_4NCH_3CO_2.32H_2O$.

As to the amount of these additives being added, for example, when calcium carbonate is used as an additive to reduce the risks of combustion, calcium carbonate is preferably added in an amount of 10 weight percent to 40 weight percent to the total amount of the oil-soluble substance and the polymer.

If calcium carbonate is added in an amount of less than 10 weight percent, the addition does not produce sufficient effects in the reduction of heat quantity in combustion and the prevention of fire from spreading. By contrast, if calcium carbonate is added in an amount of more than to 40 weight percent, the amount of stored heat is reduced due to a relatively reduced content ratio of the oil-soluble substance, which is not desirable.

When these various additives are added to the thermal storage agent in accordance with the present invention, even if the oil-soluble substance is repeatedly freezed and melted for the purpose of thermal storage and radiation, it is possible to lower the fluidity of the oil-soluble substance held in the polymer, and stably maintain the oil-soluble substance in a gel or solid state, in comparison to conventional oil-soluble substances. Therefore, even when a substance, such as metal powder, which differs from the oil-soluble substance in specific gravity by as much as 1 or even by a larger value is used as an additive, since the additive can be homogeneously held in the thermal storage agent, it becomes possible to enhance the effects of the additive.

Besides, even when the additive and the oil-soluble substance do not have good compatibility, e.g., the additive and the oil-soluble substance differ in the value of solubility parameter by not less than 2, the additive and the oil-soluble substance are held in the crosslinking structure, the separation of the additive and the oil-soluble substance from each other can be prevented, and it becomes possible to enhance the effects of the additive because of the crosslinking structure present in the polymer of the thermal storage agent in accordance with the present invention.

A manufacturing method of a thermal storage material in accordance with the present invention, employing one of the aforementioned manufacturing methods of a thermal storage agent, is a method of filling a container with a monomer component or an uncrosslinked polymer that is in a liquid state, and setting the same in the container.

That is, examples of the manufacturing method of a thermal storage material includes method (casting polymerization method) ① of charging a container with an oil-soluble substance and a monomer component containing a crosslinking monomer in a liquid state, crosslinking, polymerizing and setting the monomer component to form a bulk in the oil-soluble substance in the co-presence of an oil-soluble radical polymerization initiator, and method (casting polymerization method) ② of charging and thus filling a container with a mixture of a crosslinking agent and an uncrosslinked polymer prepared by polymerizing a monomer component containing a reactive monomer in an oil-soluble substance in the co-presence of an oil-soluble radical polymerization initiator in a liquid state before the crosslinking by the functional group and the crosslinking agent is completed, completing the crosslinking in the container, and setting the mixture.

According to methods ① and ②, since it is easily possible to liquidize the oil-soluble substance, and either the monomer component or the unreacted polymer at temperatures near room temperature, it is possible to easily fill the container densely with the oil-soluble substance and either the monomer component or the uncrosslinked polymer. Subsequently, by polymerizing or crosslinking the monomer component or the uncrosslinked polymer in the container at temperature near room temperature, it is possible to fill the container densely with a crosslinked polymer prepared by polymerizing and setting the monomer component in a state in which the oil-soluble substance is held.

Therefore, according to the methods, since it is less troublesome to fill the container with the polymer holding the oil-soluble substance therein, and it is possible to fill the container more densely with a larger amount of the thermal storage oil-soluble substance held in the polymer than conventional methods, it is possible to obtain a thermal storage material with an improved thermal storage efficiency of the oil-soluble substance in comparison with conventional methods.

The shape of the container is not limited in any particular manner. However, those shapes having a hollow part therein, such as bent tube, coil, spherical, and cylindrical shapes, are preferred for the use in air-conditioning systems of buildings, since the systems require a large contact area with a thermal conducting media in a thermal storage tank. Plate shapes are preferred for the use in floor heating systems.

The material for the container is not limited in any particular manner, as long as it does not deteriorate in contact with a thermal conducting media, an oil-soluble substance, and a polymer, and possesses resistance over a long period of time such as long term water resistance when it is immersed in an aqueous media for many years. A preferred example is polyvinyl chloride, which is cheap and easy is mold.

The following description will further discuss another embodiment in accordance with the present invention by way of examples. However, the examples by no means limit the another embodiment in accordance with the present invention.

TENTH EXAMPLE

First, a container was fabricated from a polyvinyl chloride transparent cylindrical pipe, having a diameter of 4 cm and a height of 25 cm, with a polyvinyl chloride stopper melted and attached to a lower segment of the pipe. Next, a homogeneous mixed solution was prepared by mixing 39 g of dodecyl acrylate (SP value; 7.9) and 0.8 g of ethylene glycol dimethacrylate as monomer components, 0.2 g of 2,2'-azo bis(4-methoxy-2,4-dimethyl valeronitrile as a polymerization initiator, and 160 g of pentadecane as an oil-soluble substance.

Thereafter the container was filled with the mixed solution, and nitrogen was sufficiently introduced into the mixed solution through a gas introductory tube mounted on an upper segment of the container so as to replace oxygen in the mixed solution with nitrogen.

Thermal storage agent (10) of the tenth example and thermal storage material (10) using thermal storage agent (10) were prepared by leaving the container for 8 hours in a thermostat tank of which the temperature was maintained at 40° C., while maintaining the atmosphere of nitrogen, so as to polymerize and crosslink the mixed solution, and then removing the gas introductory tube after visually confirming the formation of a polymer holding pentadecane in gel form.

ELEVENTH EXAMPLE

A flask of a 1-l capacity fitted with a thermometer, a stirrer, a gas introductory tube, and a reflux cooler was charged with 6 g of gelatin dissolved in 594 g of water. The air inside the flask was replaced with nitrogen, and heated to a temperature of 80° C. under nitrogen stream with continuous stirring.

Thereafter, a homogeneous mixed solution of 39 g of dodecyl acrylate and 0.8 g of ethylene glycol dimethacrylate as monomer components, 0.2 g of benzoyl peroxide as a polymerization initiator, and 160 g of pentadecane as an oil-soluble substance was all added into the flask simultaneously, and subjected to suspension polymerization under nitrogen stream for 2 hours with continuous stirring at 400 rpm.

The temperature inside the flask was then raised to 90° C. and maintained at that temperature for 2 hours until the polymerization was completed, so as to form a polymer holding pentadecane in gel form. After the polymerization was completed, a particulate product (average diameter; 0.3 mm) as thermal storage agent (11) of the eleventh example was prepared by filtering the contents of the flask under reduced pressure. Thermal storage material (11) of the eleventh example was prepared by filling the container described in the tenth example with the product.

TWELFTH EXAMPLE

A flask of a 500-ml capacity fitted with a thermometer, a stirrer, a gas introductory tube, two dropping funnels, and a reflux cooler was charged with 10 g of pentadecane as an oil-soluble substance. The air inside the flask was replaced with nitrogen, and heated to a temperature of 65° C. under nitrogen stream with continuous stirring.

Next, one of the dropping funnels was charged with a solution ① containing 38 g of 2-ethylhexylacrylate (SP value; 7.8) and 2 g of hydroxyethylacrylate as monomer components, and 40 g of pentadecane as an oil-soluble substance, while the other dropping funnel was charged with a solution ② containing 0.1 g of 2,2'-azo bis(4-methoxy-2,4-dimethyl valeronitrile as a polymerization initiator and 10 g of pentadecane as an oil-soluble substance and diluting solution.

Then, the solutions ① and ② were simultaneously dropped into the flask over 1 hour, and subjected to a polymerization reaction. Thereafter, the temperature inside the flask was raised to 80° C. and maintained at that temperature for 2 hours until the polymerization was completed, so as to form a polymer that was yet to be crosslinked.

After the flask was left to cool down, a solution ③ containing 2.3 g of toluene diisocyanate and 0.1 g of dibutyl tin dilaurate as crosslinking agents, and 100 g of pentadecane as an oil-soluble substance and diluting solution was added into the flask and mixed. Then the contents of the flask were immediately put into the container described in the tenth example, and left for 4 hours to let the crosslinking reaction proceed. Thermal storage agent (12), of the twelfth example, composed of a gel substance containing and holding pentadecane, and thermal storage material (12) using thermal storage agent (12) were prepared in this manner.

THIRTEENTH EXAMPLE

First, a mixed solution of 39 g of dodecyl acrylate (SP value; 7.9) and 0.8 g of ethylene glycol dimethacrylate as monomer components, and 0.2 g of 2,2'-azo bis(2,4-dimethyl valeronitrile) as a polymerization initiator was added to, and mixed with, 160 g of paraffin wax (Product No. 120, available from Nippon Seiro Co., Ltd.; freezing point, 50° C.) as an oil-soluble substance that had been melted at a temperature of 60° C. in advance, so as to prepare a homogeneous mixed solution. Thereafter, the mixed solution was put into a polyvinyl chloride transparent cylindrical pipe fabricated in the same manner as in the tenth example.

Next, while maintaining the temperature of the container at 60° C. in a thermostat tank, nitrogen was sufficiently introduced into the mixed solution through a gas introductory tube mounted on an upper segment of the container so as to replace oxygen in the mixed solution with nitrogen. Thermal storage agent (13) and thermal storage material (13) using thermal storage agent (13) were prepared by leaving the container for 8 hours at a temperature of 60° C., while maintaining the atmosphere of nitrogen, so as to polymerize and crosslink the mixed solution, and then remove the gas introductory tube after visually confirming the formation of a crosslinked polymer holding paraffin wax in gel form.

The following description will explain comparative examples illustrating features of another embodiment in accordance with the present invention.

Fourth Comparative Example

The flask described in the eleventh example was charged with 160 g of pentadecane and heated to a temperature of 90° C. under nitrogen stream with continuous stirring. A thermal storage agent for comparison (4) and a thermal storage material for comparison (4) using thermal storage agent for comparison (4) were prepared by adding 40 g of 12-hydroxy stearic acid as a gelling agent into the flask, stirring the mixture at 300 rpm for 5 minutes, then filling the container described in the tenth example with the mixture, and cooling down to room temperature.

Fifth Comparative Example

The flask described in the eleventh example was charged with 160 g of pentadecane and heated to a temperature of 140° C. under nitrogen stream with continuous stirring. A thermal storage agent for comparison (5) and a thermal storage material for comparison (5) using thermal storage agent for comparison (5) were prepared by adding 40 g of an amino acid oil gelling agent (Product Name GP-1, available from Ajinomoto Co., Ltd.) into the flask, stirring the mixture at 300 rpm for 5 minutes, then filling the container described in the tenth example with the mixture, and cooling down to room temperature.

Sixth Comparative Example

A homogeneous composition was prepared by kneading 26 parts of uncrosslinked high density polyethylene (density: 0.945, MI: 0.4) and 100 parts of pentadecane with two rolls of which the temperature was adjusted to 130° C.

Then, the composition was made into pellets having an average particle diameter of about 3 mm. A thermal storage agent for comparison (6) and a thermal storage material for comparison (6) using thermal storage agent for comparison (6) were prepared by mixing 126 parts of the pellets, 2.4 parts of vinyltrimethoxy silane, and 0.18 parts of dicumyl peroxide in a sealed container in advance, extruding the mixture with an extruder of which the cylinder temperature was adjusted to 200° C., then filling the container described in the tenth example with the extruded mixture, and immersing in hot water having a temperature of 70° C. for 24 hours for crosslink formation.

Next, the changes in physical properties of thermal storage agents (10) to (13), thermal storage materials (10) to (13), thermal storage agents for comparison (4) to (6), and thermal storage materials for comparison (4) to (6) obtained by the methods of the tenth to thirteenth examples and the fourth to sixth comparative examples were measured over a period of time.

Specifically, each of thermal storage materials (10) to (12) and thermal storage materials for comparison (4) to (6) was placed in a thermostat tank where pentadecane as an oil-soluble substance was subjected to 20 times of freezing and melting according to a time program in which 2° C.×8 hours and 30° C.×8 hours were designated as one cycle. Then, the separation of pentadecane in a liquid state from the thermal storage agent in a gel or solid state was visually checked.

Thermal storage agent (13) was placed in a thermostat tank, in the same manner as above, where paraffin wax as an oil-soluble substance was subjected to 20 times of freezing and melting according to a time program in which 40° C.×8 hours and 60° C.×8 hours were designated as one cycle. Then, the separation of paraffin wax in a liquid state from thermal storage agent (13) in a gel or solid state was visually checked.

No separation of pentadecane liquidized by a phase transformation from thermal storage agents (10) to (12) present in thermal storage materials (10) to (12) was observed. No separation of liquidized paraffin wax from thermal storage agent (13) present in thermal storage material (13) was observed either. By contrast, separation of liquidized pentadecane from thermal storage agents for comparison (4) to (6) present in thermal storage materials for comparison (4) to (6) was observed. From these result, it was found out that the thermal storage agents in accordance with the present invention were superior to thermal storage agents for comparison (4) to (6) in long term stability.

As to thermal storage materials for comparison (5) and (6), especially thermal storage material for comparison (6), a deformation of the container caused by the melted and hence hot thermal storage agent for comparison filling the container was observed. It was thus found out that it was not proper to use a thermal plastic synthetic resin such as polyvinyl chloride as a material of the container.

Therefore, the manufacturing method of a thermal storage agent in accordance with the present invention can surely and easily manufacture a thermal storage agent that can prevent, for example, the combustion to a leaking flammable oil-soluble substance, is highly safe, and has long term stability in terms of safety, because the thermal storage agent can prevent leakage from a container by lowering the fluidity of the oil-soluble substance and stably holding the oil-soluble substance in a gel or solid state even when the oil-soluble substance is in a liquidized state as a result of a phase transformation caused by stored heat, and also because the thermal storage agent has excellent long term stability in terms of physical properties, e.g., no leakage of the oil-soluble substance from the container even under normal operating conditions of repeated freezing and melting for thermal radiation and storage.

Besides, according to the manufacturing method of a thermal storage material in accordance with the present invention, the thermal storage material can be obtained in a container from gelling or solidifying a oil-soluble substance by polymerizing or crosslinking in a container a monomer component or an uncrosslinked polymer which is in a liquid state at room temperature at a temperature of 40° C. or near room temperature, which is below 80° C.

For these reasons, according to the method, it is possible to cheaply and stably manufacture the thermal storage material, because it is possible to fill the container densely with the thermal storage agent, and also because it is possible to fill the container densely, easily, and stably with the thermal storage agent even if a synthetic resin, such as polyvinyl chloride, that has excellent water resistance and poor heat resistance is used as a material for the container, and it is therefore possible to avoid the inconvenience of conventional methods that the container being used must be an expensive container made of a resin material that is heat resistant but very costly, stainless that is highly resistant against deterioration but costly, or the like.

Moreover, according to the method, even if the container is molded into a complex shape of a small tube, donut, coil, etc. so as to increase the contact area with a thermal conducting media, it is possible to fill the container densely and easily with the thermal storage agent, and it is also possible to manufacture easily and stably the thermal storage material with improved thermal conduction, by filling the container with the monomer component or the uncrosslinked polymer in a liquid state at relatively low temperatures, and polymerizing or crosslinking the monomer component or the uncrosslinked polymer.

INDUSTRIAL APPLICABILITY

The thermal storage agent, device and material in accordance with the present invention, since possessing excellent thermal storage and conduction, and high safety, are applicable in various fields such as air-conditioning systems and water supplying facilities for buildings, heat and cold storage for food and chemical plants, construction material for floor heating and wall heating, cold and hot transportation systems, and solar heat collectors.

According to the manufacturing methods of a thermal storage agent and a thermal storage material in accordance with the present invention, since the thermal storage agent and the thermal storage material obtained possess excellent thermal storage and conduction, and high safety, it is possible to easily and stably manufacture a thermal storage agent, a thermal storage material, etc. that have a considerable potential in industrial applications.

What is claimed is:

1. A thermal storage agent, comprising an oily gel body containing:
   4–20 percent by weight of an oil absorbent resin which is prepared by polymerizing a monomer component containing at least one aliphatic hydrocarbon group having a carbon number of from 3 to 30 and also containing not less than 50 weight percent of at least one unsaturated compound selected from the group consisting of alkyl(meth)acrylate, alkylaryl(meth)acrylate, alkyl (meth)acrylamide, alkylaryl(meth)acrylamide, aliphatic vinyl esters, alkyl vinyl ethers, and alkylstyrenes; and
   96–80 percent by weight of a thermal storage oil-soluble substance,
   wherein said oily gel body has a unitary volume of not less than 0.01 cm$^3$.

2. A thermal storage agent as set forth in claim 1, wherein said oil-soluble substance is a compound that absorbs or releases thermal energy upon transformation between a liquid phase and a solid phase.

3. A thermal storage agent, comprising an oily gel body containing:
   4–67 percent by weight of a particulate oil absorbent resin which is prepared by polymerizing a monomer component containing at least one aliphatic hydrocarbon group having a carbon number of from 3 to 30 and also containing not less than 50 weight percent of at least one unsaturated compound selected from the group consisting of alkyl(meth)acrylate, alkylaryl(meth) acrylate, alkyl(meth)acrylamide, alkylaryl(meth) acrylamide, aliphatic vinyl esters, alkyl vinyl ethers, and alkylstyrenes; and 96–80 percent by weight of a thermal storage oil-soluble substance, wherein said oily gel bodies are in direct contact with one another.

4. A thermal storage agent, comprising an oily gel body containing:

4–20 percent by weight of an oil absorbent resin which is prepared by polymerizing a monomer component containing at least one aliphatic hydrocarbon group having a carbon number of from 3 to 30 and also containing not less than 50 weight percent of at least one unsaturated compound selected from the group consisting of alkyl(meth)acrylate, alkylaryl(meth)acrylate, alkyl (meth)acrylamide, alkylaryl(meth)acrylamide, aliphatic vinyl esters, alkyl vinyl ethers, and alkylstyrenes, said resin absorbing not less than 3 g pentadecane /g oil absorbing resin at a temperature of 25° C.; and 96–80 percent by weight of a thermal storage oil-soluble substance, wherein said oily gel body has a unitary volume of not less than 0.01 cm$^3$.

5. A thermal storage agent, comprising an oily gel body containing:

96–80 percent by weight of a thermal storage oil-soluble substance; and

4–20 percent by weight of an oil absorbent resin which is prepared by polymerizing a monomer component containing at least one aliphatic hydrocarbon group having a carbon number of from 3 to 30 and also containing not less than 50 weight percent of at least one unsaturated compound selected from the group consisting of alkyl(meth)acrylate, alkylaryl(meth)acrylate, alkyl (meth)acrylamide, alkylaryl(meth)acrylamide, aliphatic vinyl esters, alkyl vinyl ethers, and alkylstyrenes, said resin having an equilibrium absorption ratio of said oil-soluble substance of not less than 3 g/g at a temperature of (X+10) ° C., X representing the melting point of said oil-soluble substance in degrees centigrade, wherein said oily gel body has a unitary volume of not less than 0.01 cm$^3$.

6. A thermal storage agent as set forth in any one of claims 1 through 5, wherein said oil absorbent resin is prepared by suspension polymerization or suspension condensation polymerization.

7. A thermal storage agent as set forth in any one of claims 1 through 5, wherein said oil absorbent resin has an average particle diameter of not more than 5 mm.

8. A thermal storage agent as set forth in any one of claims 1–5, wherein said oil absorbent resin is prepared by polymerizing a monomer component containing not less than 50 weight percent of alkyl(meth)acrylate.

9. A thermal storage agent as set forth in any one of claims 1–5, wherein the carbon number of said aliphatic hydrocarbon group is from 4 to 24.

10. A thermal storage agent as set forth in any one of claims 1–5, wherein the carbon number of said aliphatic hydrocarbon group is from 8 to 18.

11. A thermal storage agent as set forth in any one of claims 1–5, wherein said oil absorbent resin has a crosslinked structure.

12. A thermal storage device, comprising the thermal storage agent set forth in claim 1.

13. A thermal storage material, prepared by filling a container with the thermal storage agent set forth in claim 1.

14. A manufacturing method of a thermal storage material, comprising the sequential steps of:

(a) mixing 4–20 percent by weight of an oil absorbent resin which is prepared by polymerizing a monomer component containing at least one aliphatic hydrocarbon group having a carbon number of from 3 to 30 and also containing not less than 50 weight percent of at least one unsaturated compound selected from the group consisting of alkyl(meth)acrylate, alkylaryl (meth)acrylate, alkyl(meth)acrylamide, alkylaryl (meth)acrylamide, aliphatic vinyl esters, alkyl vinyl ethers, and alkylstyrenes and 96–80 percent by weight of a thermal storage oil-soluble substance;

(b) filling a container with the mixture in a physical state in which said mixture is fluid; and (c) gelling the mixture in said container to lower the fluidity of said mixture.

15. A method of manufacturing a thermal storage agent, comprising the step of forming a polymer, in a thermal storage oil-soluble substance, from a monomer component containing at least one aliphatic hydrocarbon having a carbon number of from 3 to 30 and also containing not less than 50 weight percent of at least one unsaturated compound selected from the group consisting of alkyl(meth)acrylate, alkylaryl(meth)acrylate, alkyl(meth)acrylamide, alkylaryl (meth)acrylamide, aliphatic vinyl esters, alkyl vinyl ethers, and alkylstyrenes, wherein said polymer contains said oil-soluble substance and decreases fluidity of said oil-soluble substance when said oil-soluble substance is transformed to a liquid phase.

16. A manufacturing method of a thermal storage agent as set forth in claim 15, wherein said polymer prepared by polymerizing said monomer component has a crosslinked structure.

17. A manufacturing method of a thermal storage agent as set forth in claim 16, wherein said monomer component includes a crosslinking monomer having at least two polymeric unsaturated groups per molecule, and said crosslinking structure is formed from said crosslinking monomer by copolymerizing said monomer component.

18. A manufacturing method of a thermal storage agent as set forth in claim 16, wherein said monomer component includes a reactive monomer having a functional group for crosslink formation, and said crosslinked structure is formed by crosslinking said polymer by said functional groups with a crosslinking agent having a functional group in the presence of said oil-soluble substance.

19. A manufacturing method of a thermal storage agent as set forth in claim 18, wherein said functional group present in said reactive monomer and said functional group present in said crosslinking agent are a combination of at least one functional group selected from the group consisting of a carboxyl group, a hydroxyl group, a mercapto group, an amino group, and an amide group, and at least one functional group selected from the group consisting of an isocyanate group an epoxy group, and a carboxylic anhydride group.

20. A manufacturing method of a thermal storage agent as set forth in claim 14, wherein said reactive monomer contains a hydroxyl group, and said crosslinking agent contains at least two isocyanate groups.

21. A manufacturing method of thermal storage agent as set forth in one of claims 15 through 20, wherein said monomer component contains not less than 50 weight percent of a monomer having a solubility parameter not more than 9.

22. A manufacturing method of a thermal storage material as set forth in any one of claims 15 through 20, comprising the sequential steps of:

(a) filling a container with said monomer component and thermal storage oil-soluble substance in a liquid state; and (b) gelling said monomer component in said container.

23. A thermal accumulating method comprising the step of floating or dispersing the thermal storage agent as set forth in claim 1 in water or brine.

24. A thermal accumulating method comprising the step of floating or dispersing in water or brine a thermal accumulating material prepared by filling a container with the thermal storage agent set forth in claim 1.

25. A thermal accumulating method comprising the step of floating or dispersing in water or brine a spherical thermal accumulating material prepared by filling a container with the thermal storage agent set forth in claim 1.

26. A thermal accumulating method comprising the step of depositing a planar thermal accumulating material prepared by filling a container with the thermal storage agent set forth in claim 1 in a water thermal storage tank with a water passage retained between said planar thermal accumulating materials.

27. A thermal accumulating method comprising the step of erecting a cylindrical rectangular parallelepipedic thermal accumulating material, prepared by filling a container with the thermal storage agent set forth in claim 1, in a water thermal storage tank.

\* \* \* \* \*